(12) United States Patent
Meyer et al.

(10) Patent No.: US 8,690,655 B2
(45) Date of Patent: Apr. 8, 2014

(54) 3D SPORTS PLAYBOOK

(75) Inventors: Charles Meyer, Minneapolis, MN (US);
Dean Dalton, Eden Prairie, MN (US);
Scott Gaff, St. Paul, MN (US);
Christopher Ebbert, Minneapolis, MN (US)

(73) Assignee: Moti Sports, Inc., Minneapolis, MN (US)

( * ) Notice: Subject to any disclaimer, the term of this patent is extended or adjusted under 35 U.S.C. 154(b) by 0 days.

(21) Appl. No.: 13/406,317

(22) Filed: Feb. 27, 2012

(65) Prior Publication Data
US 2012/0244942 A1  Sep. 27, 2012

Related U.S. Application Data

(60) Provisional application No. 61/446,948, filed on Feb. 25, 2011.

(51) Int. Cl.
*A63F 9/24* (2006.01)

(52) U.S. Cl.
USPC .................. 463/4; 463/32; 434/248; 434/251

(58) Field of Classification Search
CPC ..................... A63F 2300/8011; A63B 69/002; A63B 2243/007; A63B 2024/0056; A63B 2071/0647; A63B 2024/0025
USPC .................. 463/4, 32; 434/248, 251
See application file for complete search history.

(56) References Cited

U.S. PATENT DOCUMENTS

| | | | | |
|---|---|---|---|---|
| 6,616,529 | B1 * | 9/2003 | Qian et al. | 463/1 |
| 6,710,713 | B1 * | 3/2004 | Russo | 340/573.1 |
| 7,785,199 | B2 * | 8/2010 | Nishimura et al. | 463/31 |
| 8,016,664 | B2 * | 9/2011 | Thomas et al. | 463/23 |
| 8,142,268 | B2 * | 3/2012 | Thomas et al. | 463/6 |
| 8,337,284 | B2 * | 12/2012 | Nishimura et al. | 463/4 |
| 2006/0052147 | A1 * | 3/2006 | Matthews | 463/4 |
| 2011/0013087 | A1 * | 1/2011 | House et al. | 348/564 |
| 2011/0242507 | A1 * | 10/2011 | Smith | 353/121 |
| 2013/0005415 | A1 * | 1/2013 | Thomas et al. | 463/4 |

OTHER PUBLICATIONS

"3dfootballchalkboard.com—Coaching Player Services" [online], http://www.3dfootballchalkboard.com/Custom-Services.html, Feb. 6, 2012 [retrieved on Oct. 10, 2013], retrieved from web.archive.org/web/20120206021023/http://www.3dfootballchalkboard.com/Custom-Services.html, 2 pages.

"3dfootballchalkboard.com—Features and Pricing" [online], http://www.3dfootballchalkboard.com/Features-and-Pricing.html, Feb. 6, 2012 [retrieved on Oct. 10, 2013], retrieved from web.archive.org/web/20120206021028/http://www.3dfootballchalkboard.com/Features-and-Pricing.html, 1 page.

(Continued)

*Primary Examiner* — Dmitry Suhol
*Assistant Examiner* — Jay Trent Liddle
(74) *Attorney, Agent, or Firm* — Krenz Hoff, LLP

(57) ABSTRACT

This document generally describes techniques, methods, systems, and computer program products for providing a three-dimensional ("3D") sports playbook. Such a playbook may permit someone like a football, basketball, or soccer coach to see a play executed in a classic X's and O's overhead two-dimensional ("2D") view, and also in a 3D view.

20 Claims, 18 Drawing Sheets

(56) References Cited

OTHER PUBLICATIONS

"3dfootballchalkboard.com—Home" [online], http://www.3dfootballchalkboard.com/index.html, Feb. 6, 2012 [retrieved on Oct. 10, 2013], retrieved from web.archive.org/web/20120206021043/http://www.3dfootballchalkboard.com/index.html, 1 page.

"3dfootballchalkboard.com—Order Now" [online], http://www.3dfootballchalkboard.com/ORDER-NOW-.html, Feb. 6, 2012 [retrieved on Oct. 10, 2013], retrieved from web.archive.org/web/20120206021033/http://www.3dfootballchalkboard.com/ORDER-NOW-.html, 2 pages.

"3dfootballchalkboard.com—Play of the Week" [online], http://www.3dfootballchalkboard.com/ Play-of-the-Week.html, Feb. 6, 2012 [retrieved on Oct. 10, 2013], retrieved from web.archive.org/web/20120206021038/http://www.3dfootballchalkboard.com/Play-of-the-Week.html, 2 pages.

"3dfootballchalkboard.com—Support and Tips" [online], http://www.3dfootballchalkboard.com/Blank.html, Feb. 6, 2012 [retrieved on Oct. 10, 2013], retrieved from web.archive.org/web/20120206021023/http://www.3dfootballchalkboard.com/Blank.html, 1 page.

"Championship Coaching Systems" [online], http://www.championshipsystems.com/playhooks, Nov. 17, 2010 [retrieved on Oct. 10, 2013], retrieved from web.archive.org/web/20101117061210/http://www.championshipsystems.com/playbooks, 1 page.

"Field Draw Pro—Android Apps on Google Play" [online], https://play.google.com/store/apps/details?id=air.mpbaa&hl=en, May 14, 2011 [retrieved on Oct. 10, 2013], 2 pages.

"gidironsource.com—2 Minute Drill" [online], www.gridironsource.com/gsn/index.php?option=com_content&view=article&id=62&Itemid=77, on or around Jun. 2010 [retrieved on Oct. 10, 2013], 3 pages.

"Youtube—3D Playbook" [online video], http://www.youtube.com/watch?v=3xYBcBB86QA, video length 0:35, Aug. 11, 2009 [video images retrieved on Oct. 10, 2013], 16 pages of video images.

"Youtube—Interactive 3D Playbook—gridironsource.com" [online video], http://www.youtube.com/watch?7=AzbTjB0X6ek, video length of 1:52, Jun. 27, 2010 [video images retrieved on Oct. 10, 2013], http://www.youtube.com/watch?v=3xYBcBB86QA44 pages of video images.

\* cited by examiner

3D SPORTS PLAYBOOK

CROSS-REFERENCE TO RELATED APPLICATIONS

This application claims the benefit under 35 U.S.C. §119 (e) of U.S. Patent Application No. 61/446,948, filed Feb. 25, 2011, which is incorporated herein by reference in its entirety.

TECHNICAL FIELD

This document generally describes techniques, methods, systems, and computer program products for providing a 3D sports playbook.

BACKGROUND

Coaches of various sports, like football, have used playbooks to design and implement plays for their teams. For example, a playbook for a football team can include various football plays, such as offensive plays (e.g., running plays, passing plays) and defensive plays (e.g., blitz plays, pass defense plays). A play includes a coordinated sequence of actions by some or all members of a team. Plays can be depicted in a playbook with icons (e.g., X's and O's) representing players and with other marks indicating various actions taken by each player. For example, a football play can depict routes that are run by players as lines extending from a starting position to an end position for each player as part of the play.

SUMMARY

This document generally describes techniques, methods, systems, and computer program products for providing a three-dimensional ("3D") sports playbook. Such a playbook may permit someone like a football, basketball, or soccer coach to see a play executed in a classic X's and O's overhead two-dimensional ("2D") view, and also in a 3D view. In either view, the players can be rendered as life-like players, or as icons that are representative of players but that do not resemble actual players. In addition, the coach can see the play as if viewing the play from the perspective of one of the players. For example, a football coach can have the play played out, where a camera view can represent a view that a pulling guard sees as the play is run (according to its planned execution), so as to obtain an appreciation for what the guard will see.

In certain implementations, the execution by each player can be set so that the play runs the same each time. In other examples, the execution of each player may vary—e.g., players can do a better or worse job—so that a coach can see variability that may occur when the play is actually executed. A coach may also apply ability levels to each of the simulated players so as to affect how well and how consistently they execute the play. For example, a large and talented lineman in football may be made to push his opponent farther backward than would a smaller, less able lineman. Likewise, test information for each player may be input so that, for example, the smaller lineman will reach the corner faster when pulling will than a larger, slower lineman.

In one implementation, a computer-implemented method includes receiving, at a computing device, user input to display a sports play that involves a plurality of players; displaying, by the computing device, the play in both a 2D interface and a 3D interface using data associated with the play and the plurality of players; in response to an indication for the 3D interface to use a camera view that follows a particular player from among the plurality of players, adjusting the camera view of the 3D interface based on a location of the particular player in the play; and in response to an indication to run the play, displaying the plurality of players moving synchronously in the 2D interface and in the 3D interface in a manner determined before the play is run and according to routes associated with the players, wherein the 3D interface displays the synchronous motion of the players from the camera view based on the location of the particular player and a route associated with the particular player.

In another implementation, a computer program product tangibly embodies in a non-transitory computer readable medium including instructions that, when executed, cause a computing device with a processor to perform operations including receiving, at a computing device, user input to display a sports play that involves a plurality of players; displaying, by the computing device, the play in both a 2D interface and a 3D interface using data associated with the play and the plurality of players; in response to an indication for the 3D interface to use a camera view that follows a particular player from among the plurality of players, adjusting the camera view of the 3D interface based on a location of the particular player in the play; and in response to an indication to run the play, displaying the plurality of players moving synchronously in the 2D interface and in the 3D interface in a manner determined before the play is run and according to routes associated with the players, wherein the 3D interface displays the synchronous motion of the players from the camera view based on the location of the particular player and a route associated with the particular player.

In another implementation, a computer system includes a computing device that includes at least one processor; an input device of the computing device to receive user input to display a sports play that involves a plurality of players; a display of the computing device to display the play in both a 2D interface and a 3D interface using data associated with the play and the plurality of players; and a 3D playbook application of the computing device to: i) adjust a camera view of the 3D interface based on a location of a particular player in the play in response receiving an indication for the 3D interface to follow the particular player from among the plurality of players, and ii) cause the display to present the plurality of players moving synchronously in the 2D interface and in the 3D interface in a manner determined before the play is run and according to routes associated with the players, wherein the 3D interface displays the synchronous motion of the players from the camera view based on the location of the particular player and a route associated with the particular player.

The details of one or more embodiments are set forth in the accompanying drawings and the description below. Various advantages can be provided by the disclosed techniques, systems, computer program products, and methods. For example, a helpful tool for both coaches and players can be provided. For instance, coaches can receive an accurate representation in 3D space of how a play will progress, specifically with regard to vantage point of various players running the play. Players can more readily visualize their own actions for a play as well as the actions of the other players on the field.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

This document generally describes techniques, methods, systems, and computer program products providing a 3D sports playbook. In particular, the 3D playbook can present and animate a 2D play in 3D space according to the players and actions outlined in the 2D play. A user can view plays in 3D space from one or more camera views, whether a stationary view (e.g., from a point above and behind the play) or moving view (e.g., from the simulated viewpoint of one of the players in the play). A camera view of a play is a depiction of the play in 3D space from a vantage point in the 3D space, generally not from directly above the play. A 2D play is a view from above, generally with the players represented by flat icons, such as an X for each offensive player and an O for each defensive player. Camera views can be adjusted manually and/or automatically. For example, a user can adjust a camera view by zooming in and out (e.g., using a scroll wheel on a mouse), and also by moving the vantage point or viewing angle from which the camera view is provided (e.g., moving a mouse). In another example, a camera view can be set to automatically follow one or more players while a play is run (animated) in 3D space. A variety of following camera views can be provided, such as a point of view for the player being followed (e.g., a helmet camera view) and/or a camera view from behind the player that focuses on the player.

Changes to a play made in 2D space can be dynamically and automatically reflected in a 3D rendering and/or animation of a play. For instance, 2D and 3D depictions of a play can be based on common data (e.g., player data, route data), so that a change in the data, such as moving a player's position and/or route, is automatically reflected in both 2D and 3D depictions on the fly. For example, in a football play, if a wide receiver is moved from the left side of the field to the right side of the field in a 2D depiction of a play, this change in positioning can be automatically reflected in the 3D rendering of the play. In another example, if a running back's route is changed in the 2D depiction of a play, the change in the players route can automatically be reflected in the 3D rendering and animation of the play.

Changes to a play made in 3D space can also be dynamically and automatically reflected in a 2D depiction of the play. For example, if a user selects a player in 3D space and moves the player to a different location, the relocation of this player can be reflected in the 2D depiction of the play. Changes made to plays in 2D and/or 3D space can be saved and retrieved for later viewing/editing.

Figure 1:
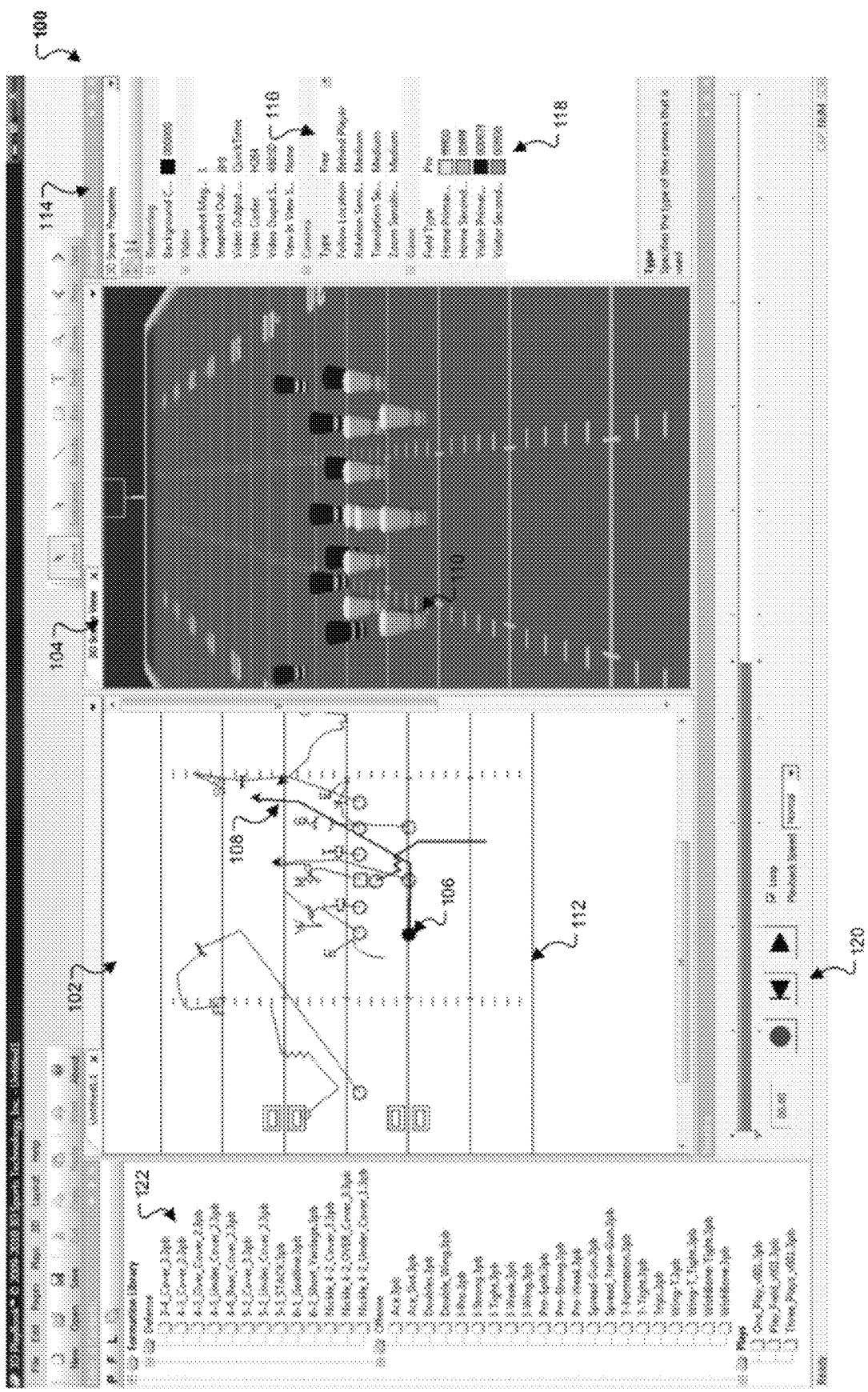
FIGS. 1-11 are screenshots of an example application that provides a 3D playbook.

FIG. 1 is a screenshot 100 of an example application that provides a 3D playbook. The example screenshot 100 presents an example football playbook. The screenshot 100 includes a 2D interface 102 that depicts a 2D depiction of a play. The screenshot 100 also includes a 3D interface 104 that provides a 3D rendering of the play. The 3D rendering of the play in the 3D interface 104 corresponds to the 2D depiction of the play in the 2D interface 102. For example, the 2D interface 102 depicts a player 106 (a running back) and a route 108 that the player 106 is going to run for the play. A corresponding 3D representation of the player 106 is provided as player 110 in the 3D interface 104. Although not included in the example screenshot 100, the route 108 can also be depicted in the 3D interface 104.

The 2D and 3D interfaces 102 and 104 provide graphical elements that correspond to players, routes, and the field with which a user can interact through any of a variety of input devices (e.g., mouse, keyboard). For example, the player 106 is a graphical element that user can select and drag to a different location in the 2D depiction of the play. In another example, the route 108 is a graphical element a user can edit and move to a different location in the 2D depiction of the play. Such changes to the player 106 and/or the route 108 can be reflected in the 3D rendering of the play in the 3D interface 104. For example, if the player 106 is moved to a new location, then the corresponding player 110 can be automatically moved to a corresponding location in the 3D interface 104. Similarly, the player 110 can be moved to a different location in the 3D interface 104, and the corresponding player 106 can be automatically moved to a corresponding location in the 2D interface 102.

A field box 112 depicted in the 2D interface 104 is another graphical element with which users can interact. For example, the field box 112 can be selected and dragged to the right so that the center lines up on the left hash mark of the field. In response to such user interaction, the players can line up on the left hash mark in the 3D interface 104. The field box 112 can provide a convenient way for adjusting the location at which a play is taking play on the field.

Each of these graphical elements can correspond to one or more data elements, such as a data object, and can have corresponding properties that define various attributes of the elements. For example, players (e.g., player 106) can have a variety of corresponding properties, such as properties regarding their name, speed (e.g., running speed), size (e.g., height), and/or appearance (e.g., an image of the player, a 3D model of the player, a 3D motion-capture model of the player performing various actions). In another example, routes (e.g., route 108) can have a variety of corresponding properties, such as properties regarding timing for the route (e.g., delay one second at the start of the play before running the route) and/or speed of the route (e.g., perform route at half speed). In a further example, a field box (e.g., the field box 112) can have a variety of properties, such as a location of the field box relative to the field (e.g., field box located at 10 yard line).

When a graphical element is selected (e.g., has focus), properties corresponding to the graphical element can be presented in the properties tab 114 of the application. In the example screenshot 100, the properties displayed in the properties tab 114 are properties associated with the 3D interface 104. These properties include a property 116 for the type of camera view used in the 3D interface 104 to render a play. In the depicted example, the camera view is set to "free," meaning that a user is able to dynamically toggle the camera view in the 3D interface 104 through various inputs, such as moving a pointer (e.g., moving a mouse). In the example screenshot 100, the camera is positioned above and behind the offense in the 3D interface 104. Other properties displayed in the properties tab 114 for the 3D interface 104 include adjustable uniform colors 118 for the teams depicted on the field.

Animation of the play in the 3D interface 104 and in the 2D interface 102 can be controlled using buttons 120. The buttons 120 include a record button, a rewind button, and a play button. The record button can be used to record actions for a play, such as routes for various players to run as part of a play. The rewind button can rewind playback to the beginning of the play. And the play button can cause the play to be run according to the actions (e.g., routes) depicted in the 2D interface 102 for the play (although not depicted in the screenshot 100, actions can also be depicted in the 3D interface 104). Animation of a play can cause players to move according to the designated actions (e.g., routes) in both the 2D interface 102 and the 3D interface 104. For instance, the black circle for the player 106 in the 2D interface 102 and the 3D representation of the player 110 in the 3D interface 104 can move in sync according to the route 108 when the play is run (after the play button is pressed).

The example screenshot 100 also depicts a table of contents pane 122 that provides an organized and expandable display of plays, formations, and print layouts. In the depicted example, the table of contents pane 122 displays a library of formations for defense and offense. Formations can serve as templates from which plays can be constructed. For example, instead of having to place individual players for each play that will be constructed, previously created formations can be used as a starting point for play creation. Like plays, formations can be created and displayed in both the 2D interface 102 and 3D interface 104.

Figure 2:
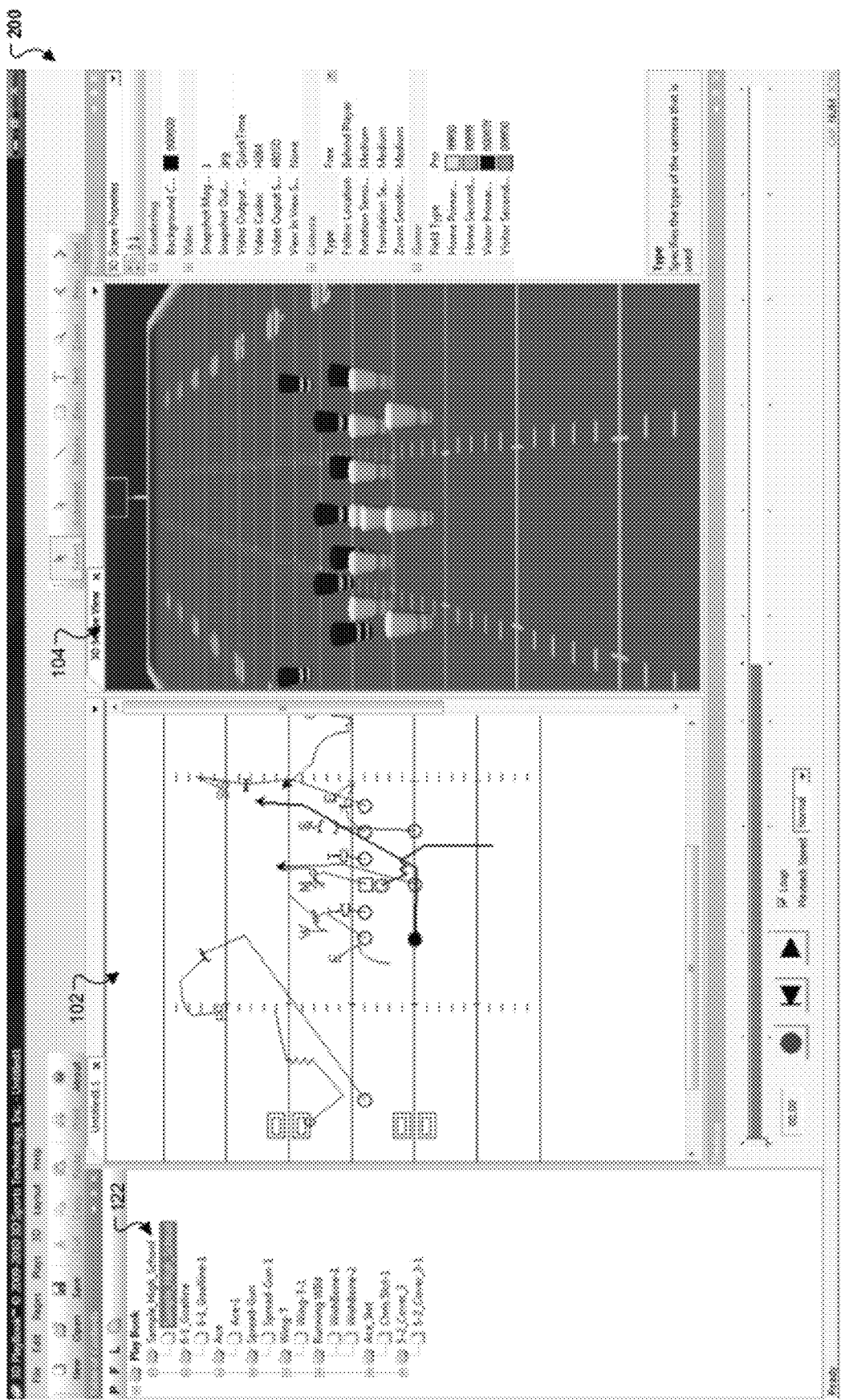

FIG. 2 is a screenshot 200 of an example application that provides a 3D playbook. The example screenshot 200 depicts the same 2D interface 102 and the same 3D interface 104 as in the screenshot 100, but the table of contents pane 122 depicts an example of a user designed playbook. Each of the plays listed in the playbook can be loaded into the 2D and 3D interfaces 102 and 104 for editing and playback. For example, selection of the play "Sample_High_School" (highlighted in blue) can cause the play to be loaded into the interfaces 102-104. Each of the plays can correspond to one or more data files that can be stored on a file system and loaded for use by the application.

The plays can be organized in the pane 122 using the expandable folders. For example, a user can designate various categories of plays using folders and can organize plays by placing plays in corresponding folders. For instance, the folder "Running Wild" includes two plays, "WishBone-1" and "WishBone-2."

Figure 3:
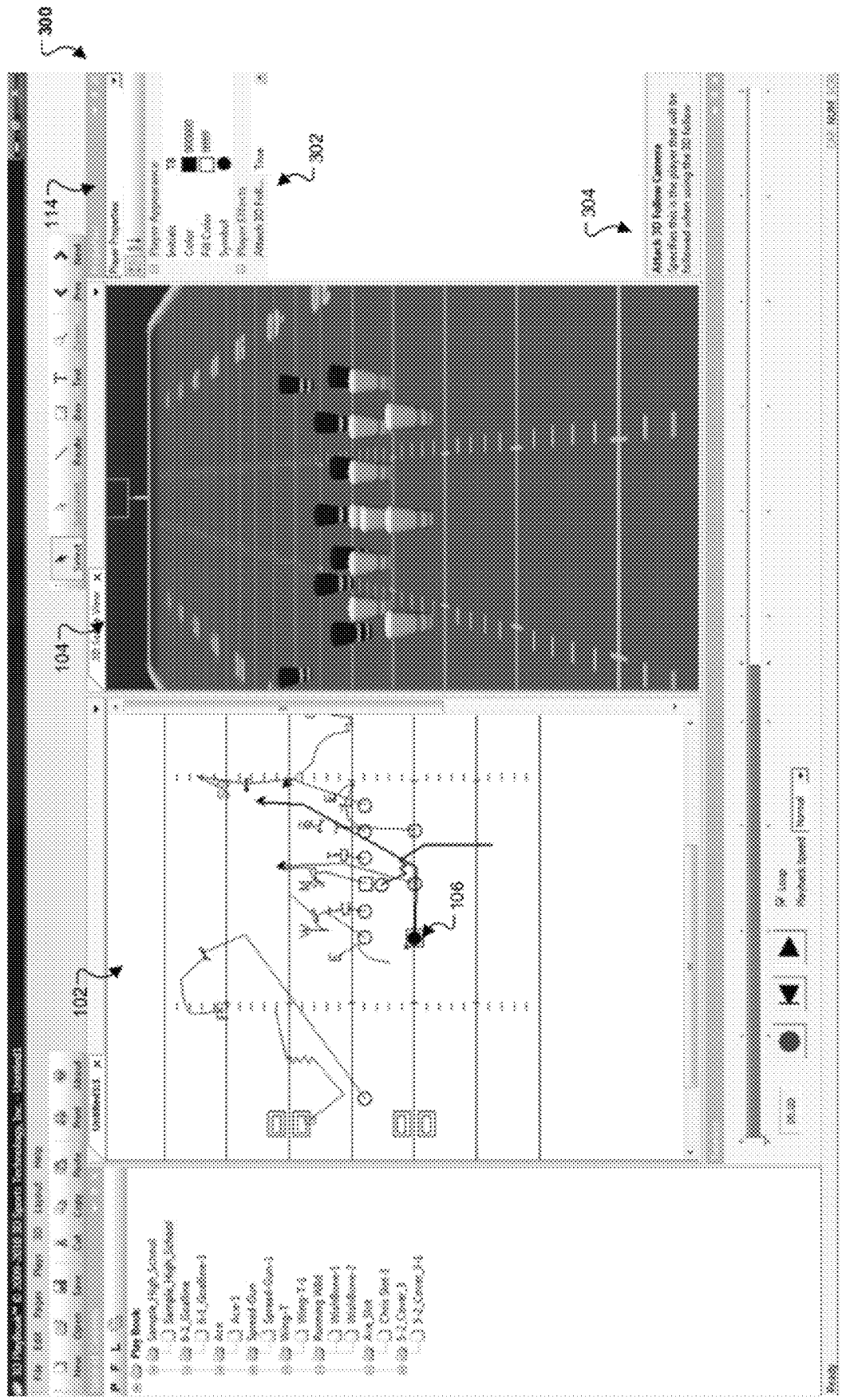

FIG. 3 is a screenshot 300 of an example application that provides a 3D playbook. The screenshot 300 depicts the 2D and 3D interfaces 102 and 104, respectively. In the screenshot 300, the black circle representing player 106 has been selected by a user (e.g., mouse click on the circle), as indicated by the square surrounding the circle. Selection of the player 106 causes the properties tab 114 to change to represent properties associated with the 2D representation of the player 106, such as a name associated with the player 106 ("FB") and a symbol corresponding to the player (a black circle). Also, property 302 indicates whether a 3D camera is set to follow the selected player in the 3D interface 104. In the present example, the value for the property 302 is set to true, which can cause the 3D interface 304 to change the camera view from a free view (where the user controls the position of the camera), to a camera view that is automatically adjusted to follow the player 106. The information box 304 provides a description of properties in the properties tab 114 and, in this example, explains the 3D follow property 302.

Figure 4:
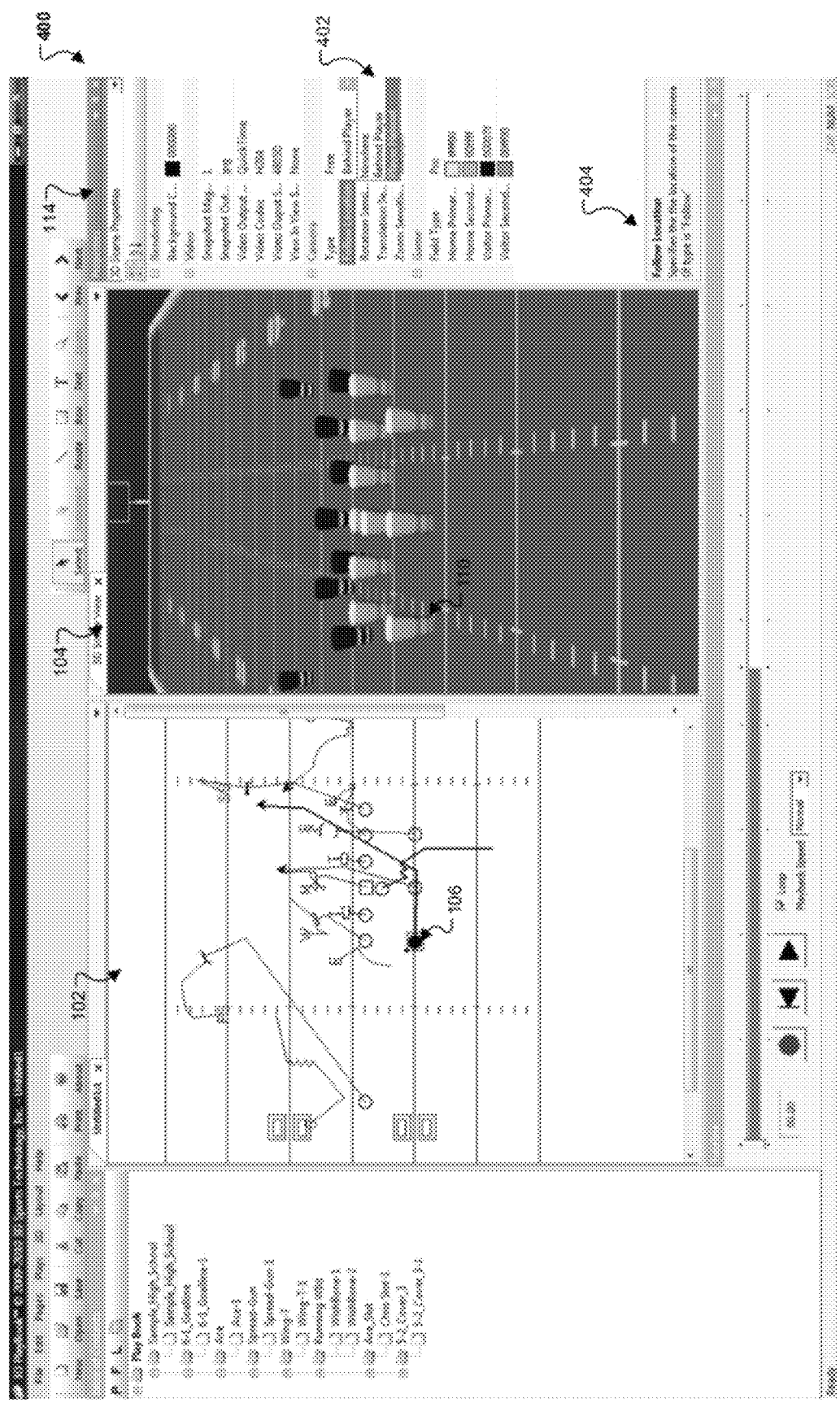

FIG. 4 is a screenshot 400 of an example application that provides a 3D playbook. The screenshot 400 depicts the 2D and 3D interfaces 102 and 104, respectively. In the screenshot 400, the properties tab 114 has been changed to the properties for the 3D interface 104. The property "follow location" 402 provides a few options for the camera position when the camera is set to follow a particular player in the 3D interface 104, such as the 3D player 110 which corresponds to the 2D player 106 (which is depicted in FIG. 3 as having the 3D follow property 302 set to true). In this example, locations for a follow camera include "behind the player" (above and behind the player—providing a contextual view of the player's forward motion) and "player helmet" (a point of view camera). Other locations for a follow camera view are also possible, such as a bird's eye view (elevated view) that follows the player 110. Information box 404 provides an explanation of the follow location property.

Figure 5:
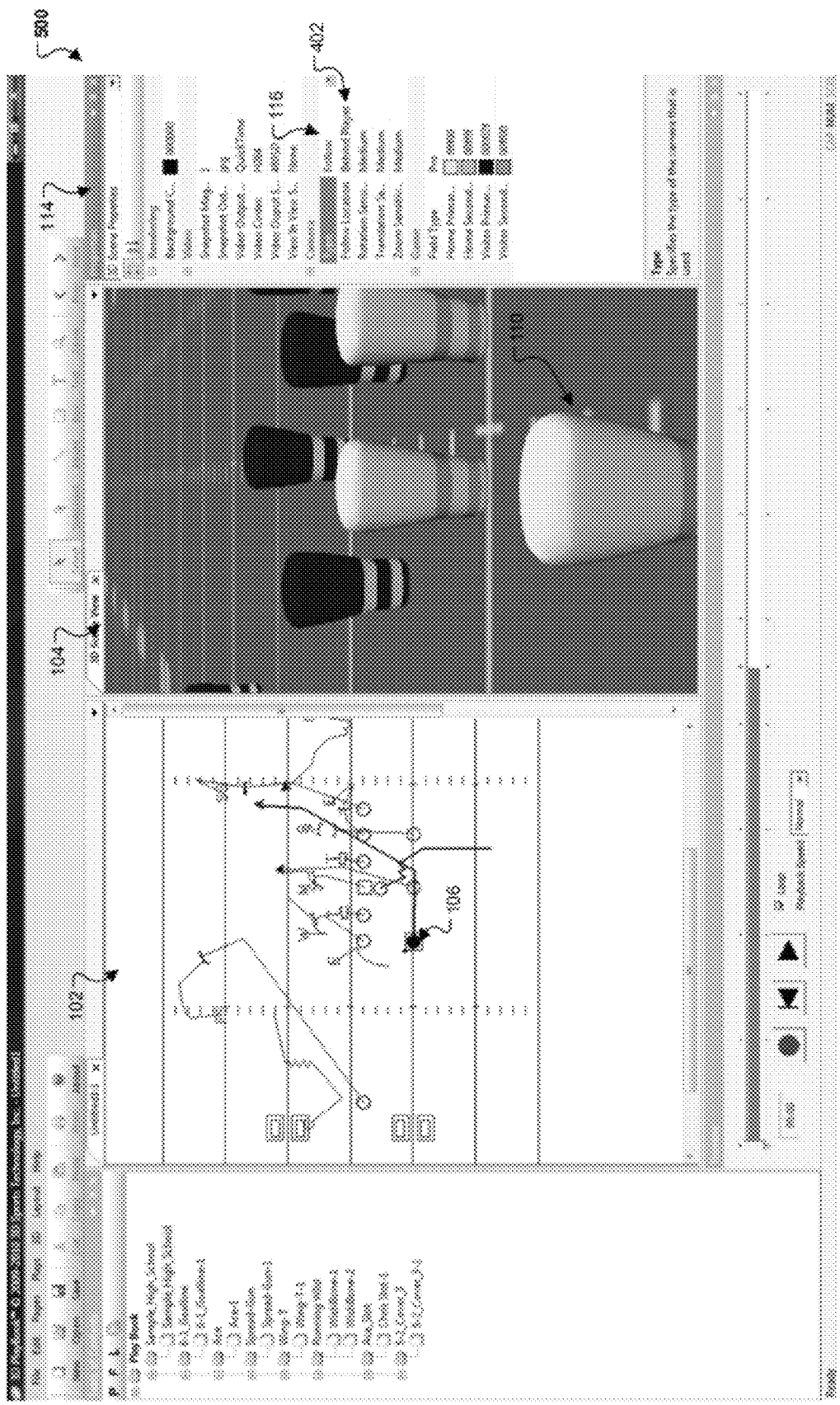

FIG. 5 is a screenshot 500 of an example application that provides a 3D playbook. The screenshot 500 depicts the 2D and 3D interfaces 102 and 104, respectively. In the screenshot 500, the property 116 for the camera type has been changed to "follow" and the follow location property 402 has been changed to "behind player." With the 3D "follow" property having been set to "true" for the 2D player 106 (3D player 110), as described above with regard to FIG. 3, the camera view changes to a view from behind the player 110 in the 3D rendering of the play.

Figure 6:
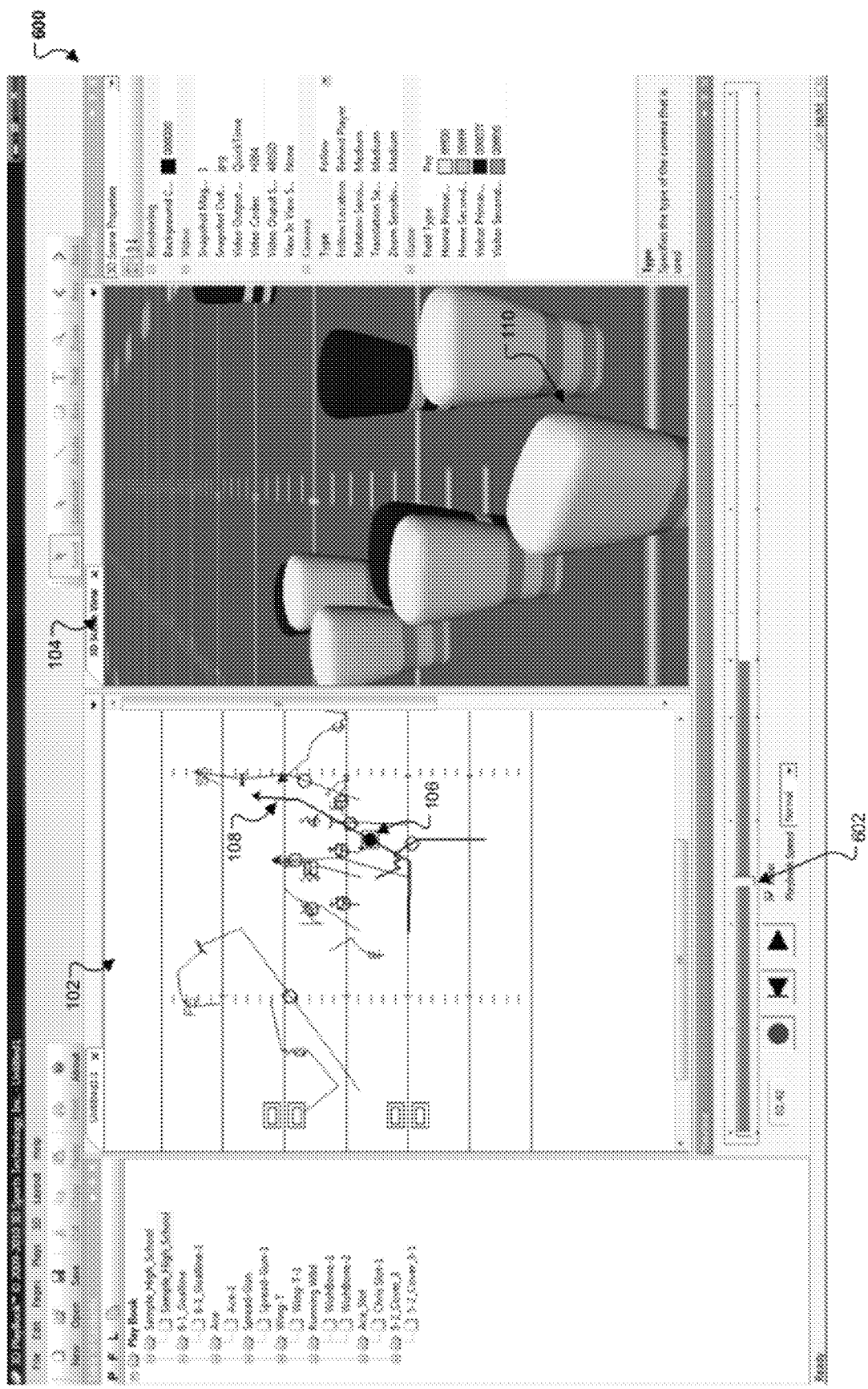

FIG. 6 is a screenshot 600 of an example application that provides a 3D playbook. The screenshot 600 depicts the 2D and 3D interfaces 102 and 104, respectively. In the screenshot 600, the play depicted in the interfaces 102 and 104 is midway through being run, as indicated by the animation progress 602. The 2D and 3D interface 102 and 104 depict the animation of the player 106/110 along the route 108. The 2D interface 102 presents the player 106 as having progressed about halfway through the route 108. The icon representing the player 106 can move along the route 108 as part of the play animation. Additionally, the 2D icons representing the other players on the field move according to their respective routes (and properties, like time delays) in the 2D interface when the play is run/animated. The square box around the icon 106 can indicate that the camera view in the 3D interface 104 is focused on the player 106.

Concurrently and synchronously with movement of the player 106 in 2D space, the corresponding 3D player 110 moves along the route 108 in 3D space (along with the movement of the other players along their respective routes). Using a camera view that automatically follows behind the player 110, the 3D interface 104 depicts the player 110 midway through running the route 108. In this example, the camera view of the 3D interface 104 is attached to the player and follows the player without further action from the user. This feature can provide a helpful tool for both coaches and players. For instance, coaches can receive an accurate representation in 3D space of how a play will progress, specifically with regard to vantage point of various players running the play. Players can more readily visualize their own actions for a play as well as the actions of the other players on the field.

A user can drag the animation progress indicator 602 to toggle the play forward or backward. When the progress indicator 602 is dragged, the players move to corresponding locations along their respective routes in the 2D and 3D interface 102 and 104.

Figure 7:
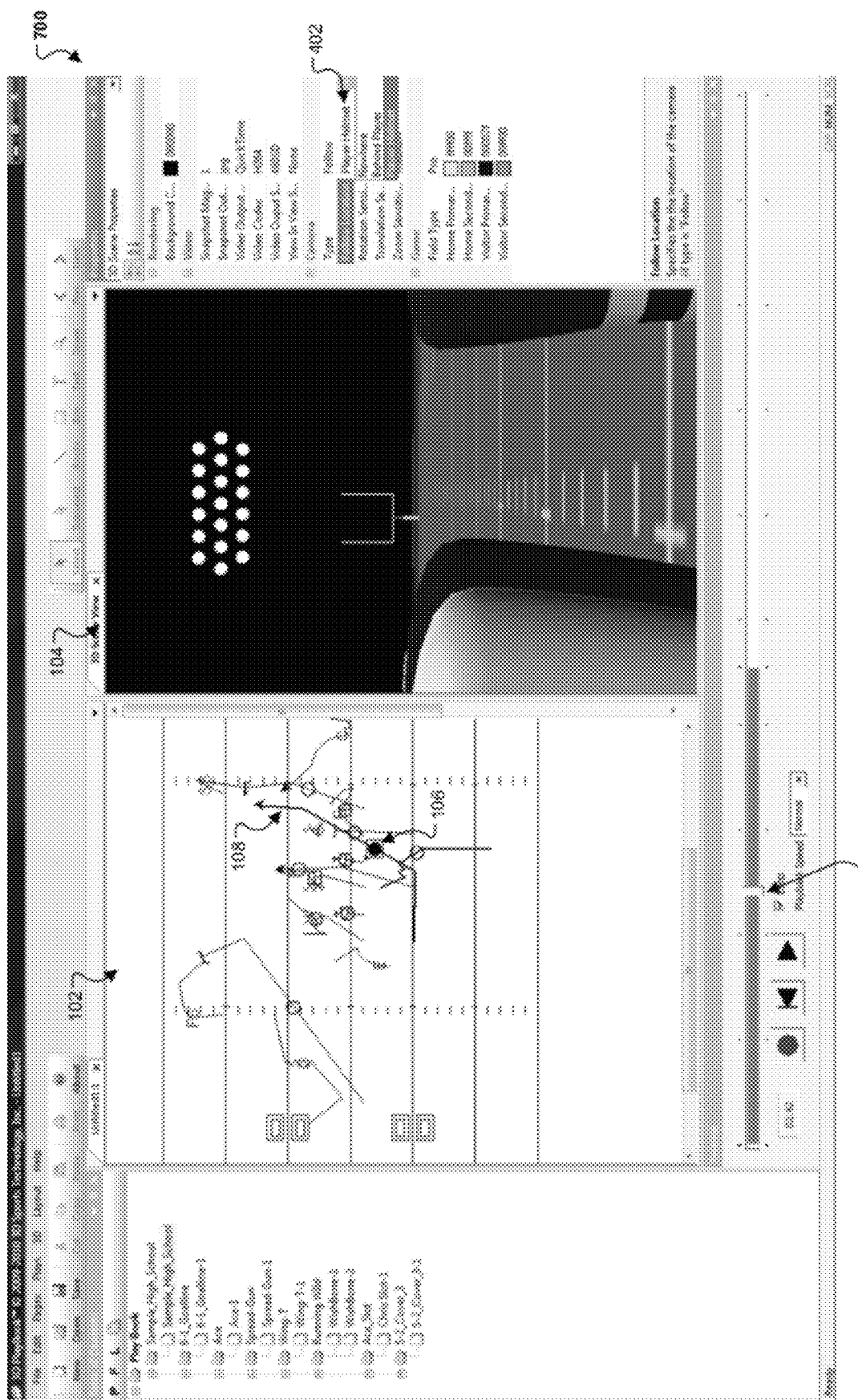

FIG. 7 is a screenshot 700 of an example application that provides a 3D playbook. The screenshot 700 depicts the 2D and 3D interfaces 102 and 104, respectively. In the screenshot 700, the property 402 identifying the follow location of the camera is changed to "player helmet." Accordingly, the camera in the 3D interface 104 changes to a view from the perspective of the player 106 (helmet view for player 106) along the route 108 midway through the play, as indicated by the progress indicator 602. The camera view for the 3D interface 104 can change dynamically and on the fly (without having to regenerate, process, or compile video for the play).

Figure 8:
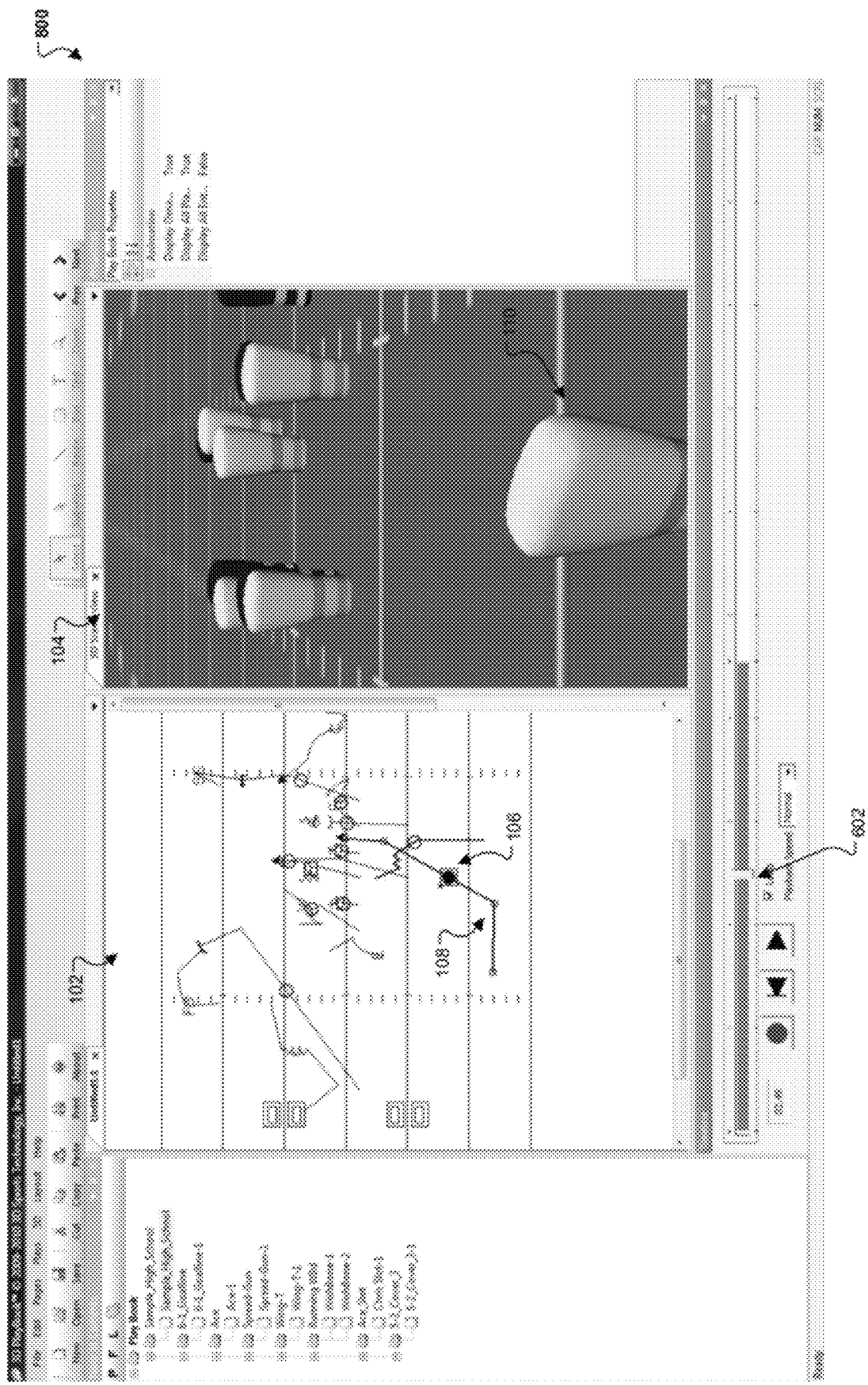

FIG. 8 is a screenshot 800 of an example application that provides a 3D playbook. The screenshot 800 depicts the 2D and 3D interfaces 102 and 104, respectively. In the screenshot 800, the player 106 and the route 108 are moved further into the backfield in the 2D interface 102. For example, a user can select the player 106 and/or the route 108, and drag the selection to a desired location for the play. Edits to player locations and routes can be performed when the play is stopped and/or while the play is animated (being run) in the interfaces 102 and 104. The camera view (behind player 110) in the 3D interface 104 is automatically adjusted on the fly to reflect the change in the location of the player 106 and the route 108 at the current progress of the play, as indicated by the progress indicator 602. Similarly, the player 110 and/or a route the player 110 is running (not depicted) can also be edited in the 3D interface 104, with the edits being automatically reflected in the 2D interface 102.

Figure 9:
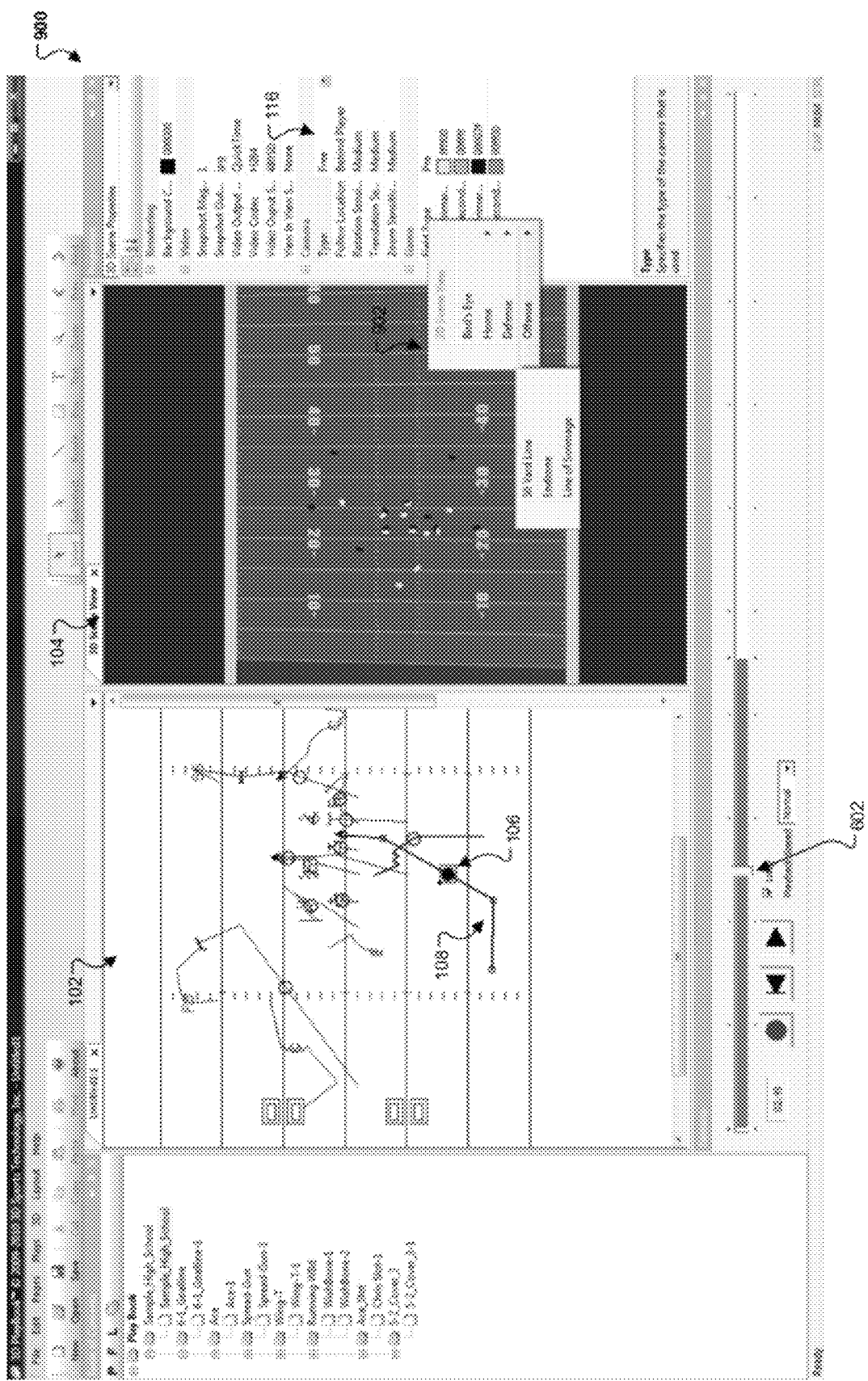

FIG. 9 is a screenshot 900 of an example application that provides a 3D playbook. The screenshot 900 depicts the 2D and 3D interfaces 102 and 104, respectively. In the screenshot 900, the camera view is switched from following the player 106/110 to instead being a free camera view that is not tethered to a player, as indicated by the property 116 being set to "free." In this example, the camera view in the 3D interface 104 is set to an overhead view of midway through the play, as indicated by the progress indicator 602. Such a change to the camera view and the property 116 can be made while the play is stopped and/or while the play is being run (animated). The screenshot 900 also depicts a few preset non-tethered (free camera type) camera view options in the menu 902. The menu 902 can be presented in response to a particular type of input in the 3D interface 104, such as a right mouse click. The menu 902 includes a preset bird's eye view, a group of defense views, and a group of offense views. The offense views are expanded in the screenshot 902 to include preset cameras that are focused on the 50 yard line, the end zone, and the line of scrimmage. Selection of one of the options can cause the camera view for the 3D interface 104 to automatically change to the desired view.

Figure 10:
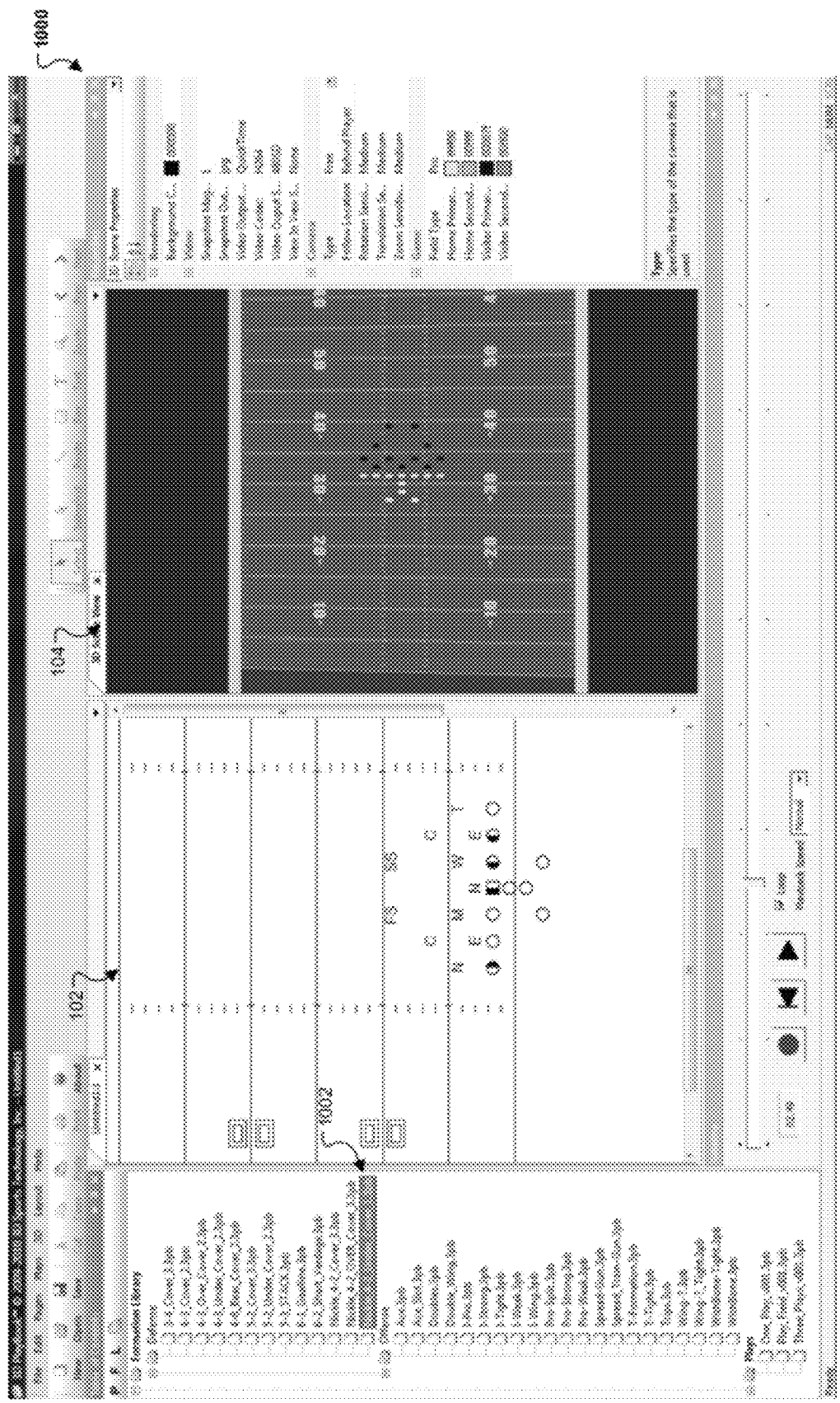

FIG. 10 is a screenshot 1000 of an example application that provides a 3D playbook. The screenshot 1000 depicts the 2D and 3D interfaces 102 and 104, respectively. An example formation is depicted in the screenshot 1000. As described above, formations can serve as templates for plays and can be used to provide a starting place for play development. In the depicted example, the defensive formation 1002 ("Nickle_4-2_Under_Cover_1") is selected and depicted in the 2D and the 3D interfaces 102 and 104, respectively. Formations can be designed and edited like plays. Formations can also be set as "read only," so as to protect from accidental edits. The camera view depicted in the screenshot 1000 for the 3D interface 102 is an overhead view. Other camera views of formations are also possible, like the camera views described above with regard to camera views of plays.

Figure 11:
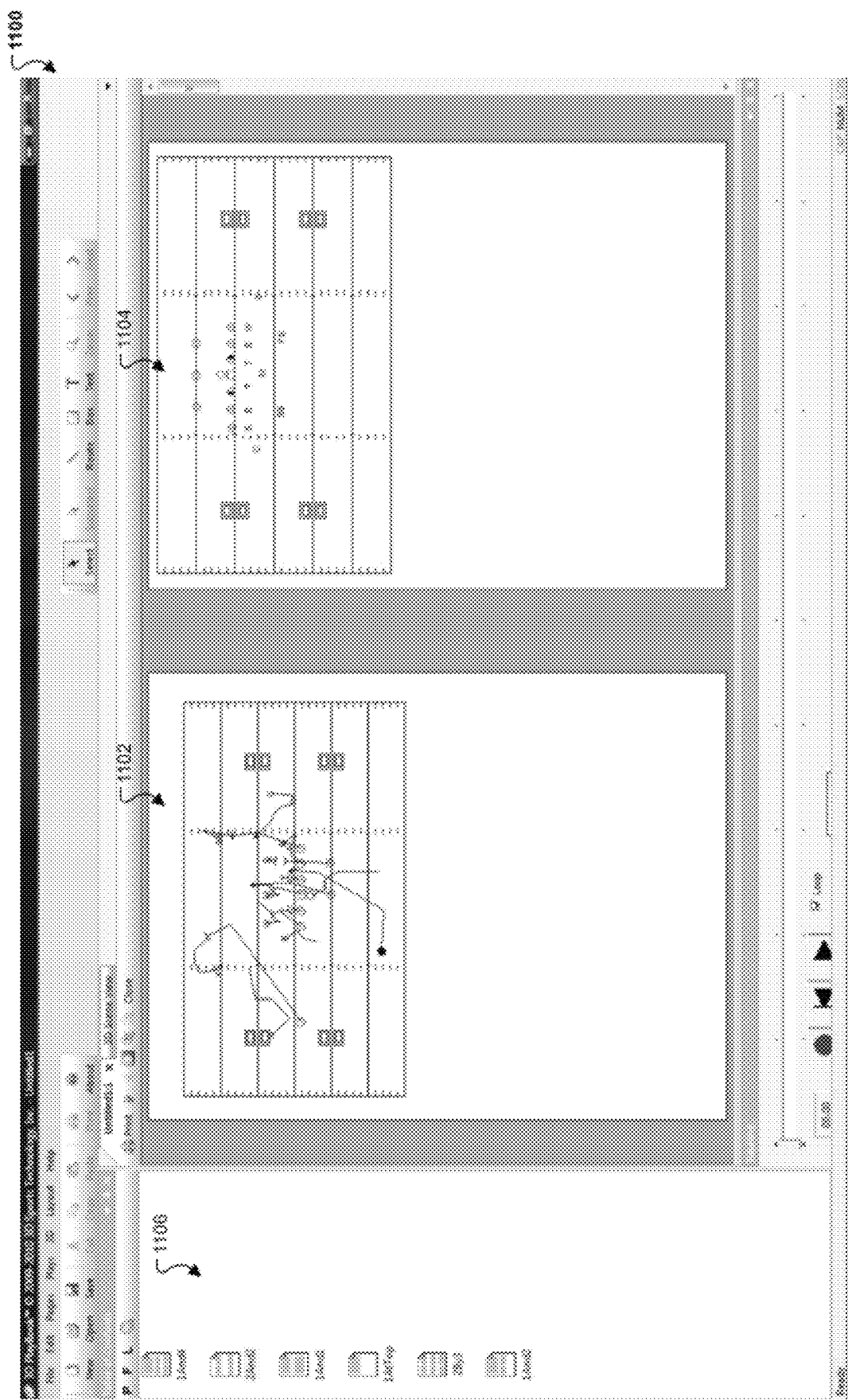

FIG. 11 is a screenshot 1100 of an example application that provides a 3D playbook. The screenshot 1100 depicts print layouts 1102 and 1104 for a play and a formation, respectively. The layouts 1102 and 1104 can be provided to a printer for printing. A variety of different play/formation layouts 1106 are depicted, such as a layout with one large play at the top of a page and four smaller plays at the bottom of the page. Such layouts can be used to group related plays together. Play grouping can be based on the organization of plays as described above with regard to FIG. 2.

Figure 12:
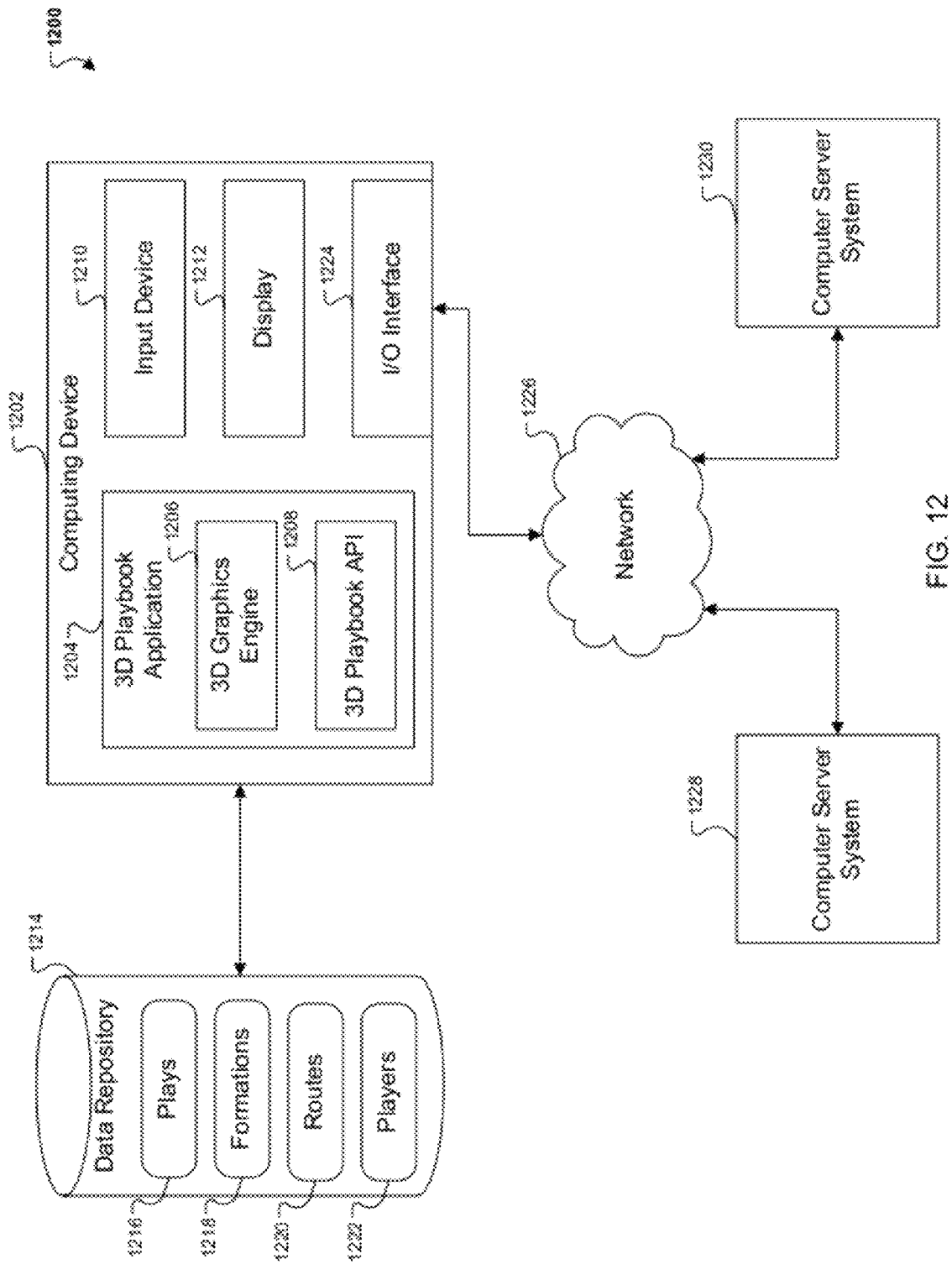
FIG. 12 depicts an example computer system for providing a 3D playbook.

FIG. 12 depicts an example computer system 1200 for providing a 3D playbook. The example system 1200 is depicted as including a computing device 1202 that provides a 3D playbook that is similar to the 3D playbooks described above with regard to FIGS. 1-11. The computing device 1202 can be any variety of computing devices, such as a desktop computer, a laptop computer, a computer server, a mobile device (e.g., a smartphone, a personal digital assistant (PDA), a cell phone), and/or a tablet computing device.

The computing device 1202 includes a 3D playbook application 1204 that is configured to present plays in a 2D and 3D interface, similar to the interfaces 102 and 104 described above with regard to FIGS. 1-11. The 3D playbook application 1204, and its components, can be implemented in hardware (e.g., application specific integrated circuit (ASIC)) and/or software (e.g., instructions that are executable by one or more computer processors). The 3D playbook application 1204 can include various components, such as a 3D graphics engine 1206 (e.g., OGRE 3D graphics engine) and a 3D playbook application programming interface (API) 1208. The 3D graphics engine 1206 can render 3D graphics for a 3D interface of the 3D playbook application 1204, and the 3D playbook API 1208 can include various instructions and/or data for performing the features described above with regard to FIGS. 1-11.

The computing device 1202 also includes an input device 1210 (e.g., a mouse, a microphone, a touch-sensitive screen) and a display 1212 (e.g., a computer monitor, a mobile device screen) that are configured to receive user input for and to provide output from the 3D playbook application 1204.

The computing device 1202 can access data used for the 3D playbook application 1204 from a data repository 1214 (e.g., a database, a file system). The data repository 1214 can be local to and/or remote from the computer device 1202. The data repository 1214 can include a variety of data that may be used by the 3D playbook application 1204, such as data regarding plays 1216, formations 1218, routes 1220, and/or players 1222.

The computing device 1202 can also include an input/output (I/O) interface 1224 (e.g., an Ethernet card, a wifi card) that is configured to enable communication between the computing device 1202 and other computing devices over a network 1226. The network 1226 can be any of a variety of computer networks, such as a local area network (LAN), a wide area network (WAN), a wireless network, the Internet, a virtual private network (VPN), an optical network, or any combination thereof. The computing device 1202 can communicate with various computing devices, such as computer server systems 1228 and 1230, over the network 1226 to provide the 3D playbook application to a user of the computing device. For example, the 3D playbook application 1204 can be a web based application that is hosted on the computer server system 1228 and that is downloaded by the computing device 1202. In another example, some or all of the data in the data repository 1214 can be stored on and served by the computer server system 1230 to the computing device 1202 over the network 1226.

Figure 13:
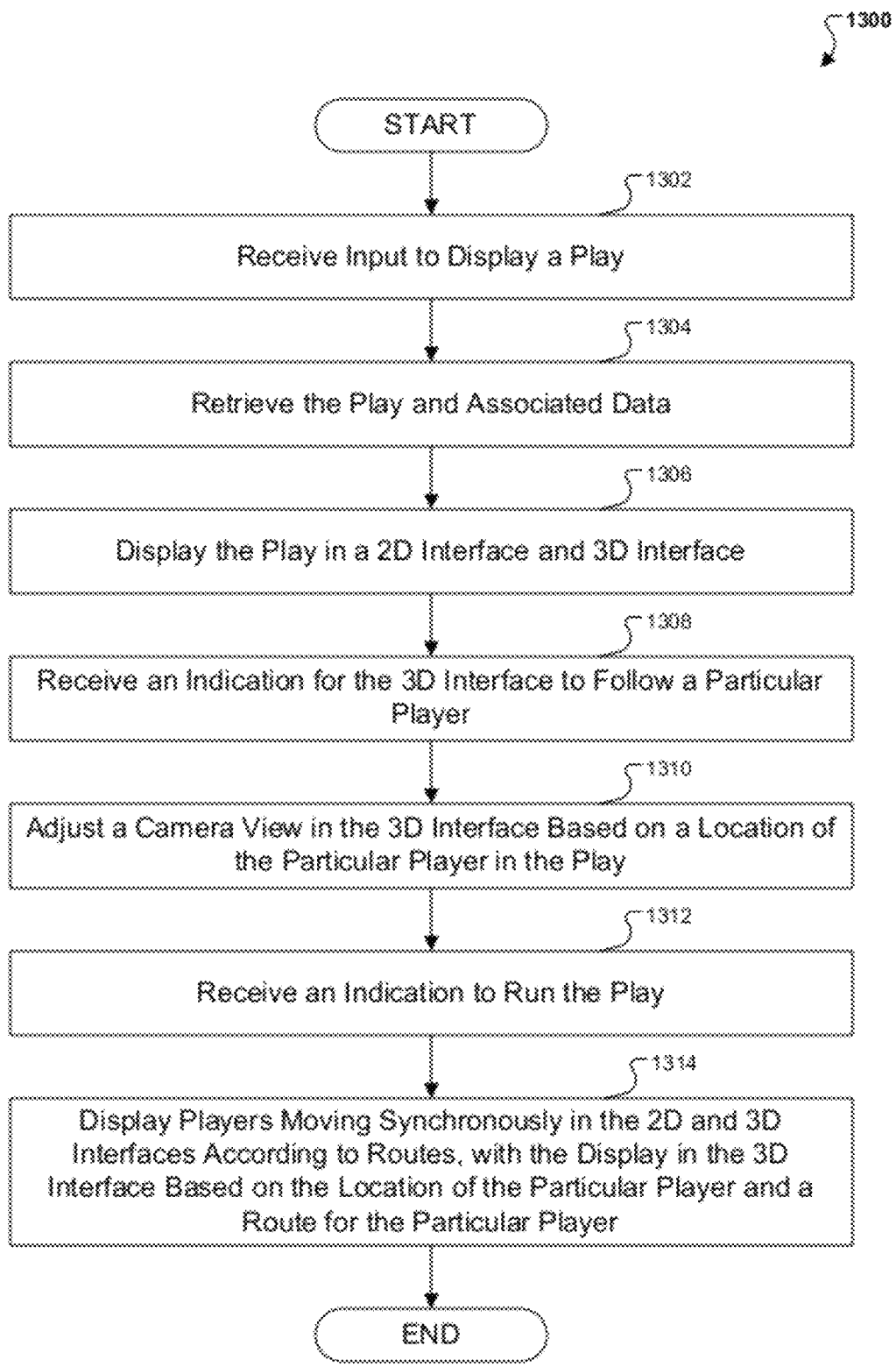
FIG. 13 is a flowchart of an example technique for displaying a play synchronously in a 2D interface and a 3D interface.

FIG. 13 is a flowchart of an example technique 1300 for displaying a play synchronously in a 2D interface and a 3D interface. The technique 1300 can be performed by any of a variety of computing devices, such as the computing device 1202 described above with regard to FIG. 12. The technique 1300 can be performed with and/or separately from the other described techniques.

The example technique 1300 starts at step 1302 by receiving input to display a play from a playbook. For example, input can be received in response to a user selecting a play from the list of plays provided in the pane 122, as described above with regard to FIG. 2. The play and data associated with the play (e.g., player data, route data) can be retrieved (step 1304). For example, the computing device 1202 can retrieve the play and other associated data from the data repository 1214 described above with regard to FIG. 12. The play is displayed in a 2D interface and a 3D interface using the retrieved data (step 1306). For example, a play is displayed in the 2D interface 102 and the 3D interface 104, as described above with regard to FIGS. 1-10.

An indication can be received for the 3D interface to follow a particular player that is part of the displayed play (step 1308). For example, FIG. 3 depicts a user selecting the player 106 in the 2D interface 102 and setting the property 302 for the camera view in the 3D interface 104 to follow the corresponding 3D player 110. The camera view in the 3D interface can be adjusted based on a location of the particular player in the play (step 1310). For example, FIG. 5 depicts the camera view for the 3D interface 104 being adjusted to be behind the player 110, and FIG. 7 depicts the camera view for the 3D interface 104 being adjusted to be a point of view (helmet cam) for the player 110.

An indication is received to run the play (step 1312). For example, a user can select a play button for the play, as described above with regard to FIG. 1. In response to receiving the indication to run the play, the players can be displayed as moving synchronously across the 2D and 3D interfaces according to respective routes for the players (step 1314). The display in the 3D interface can be based on the location of the particular player and a route associated with the particular player (step 1316). For example, FIGS. 5-6 depict the camera view in the 3D interface following the player 110 while the players in the 2D interface and the 3D interface move in synch. The technique can end after step 1316.

Sports other than football can be provided in 3D playbooks, such as soccer, ice hockey, lacrosse, basketball, baseball, softball, volleyball, water polo, and/or rugby.

Video files can be generated and exported based on animation presented in a 2D interface and/or a 3D interface. Video compilations can be generated for particular players and/or for particular positions. For example, a collection of video files (or a single video file) for a running back position can be generated from a playbook so that there is a video for each play that involves the running back position. Such player/position specific video files can be generated using a camera view that is attached to the player/position (e.g., point of view camera, behind player camera view). Similarly, separate video files and/or collections of video files for each player on a team can be produced for an individual play and/or for all of the plays within a playbook.

A 3D playbook can also support multiple 3D interfaces. For example, multiple separate camera view can be displayed simultaneously in different 3D interfaces. For example, three 3D interfaces can be used to display a play as it progresses at a bird's eye view, a first point of view camera angle from a first player's view, and a second point of view camera from a second player's view. In another example, a separate 3D interface can be provided to simultaneously display the point of view for each player of a team as they progress through a play. The separate 3D interfaces can be labeled to indicate what is being shown in each interface.

Figure 14:
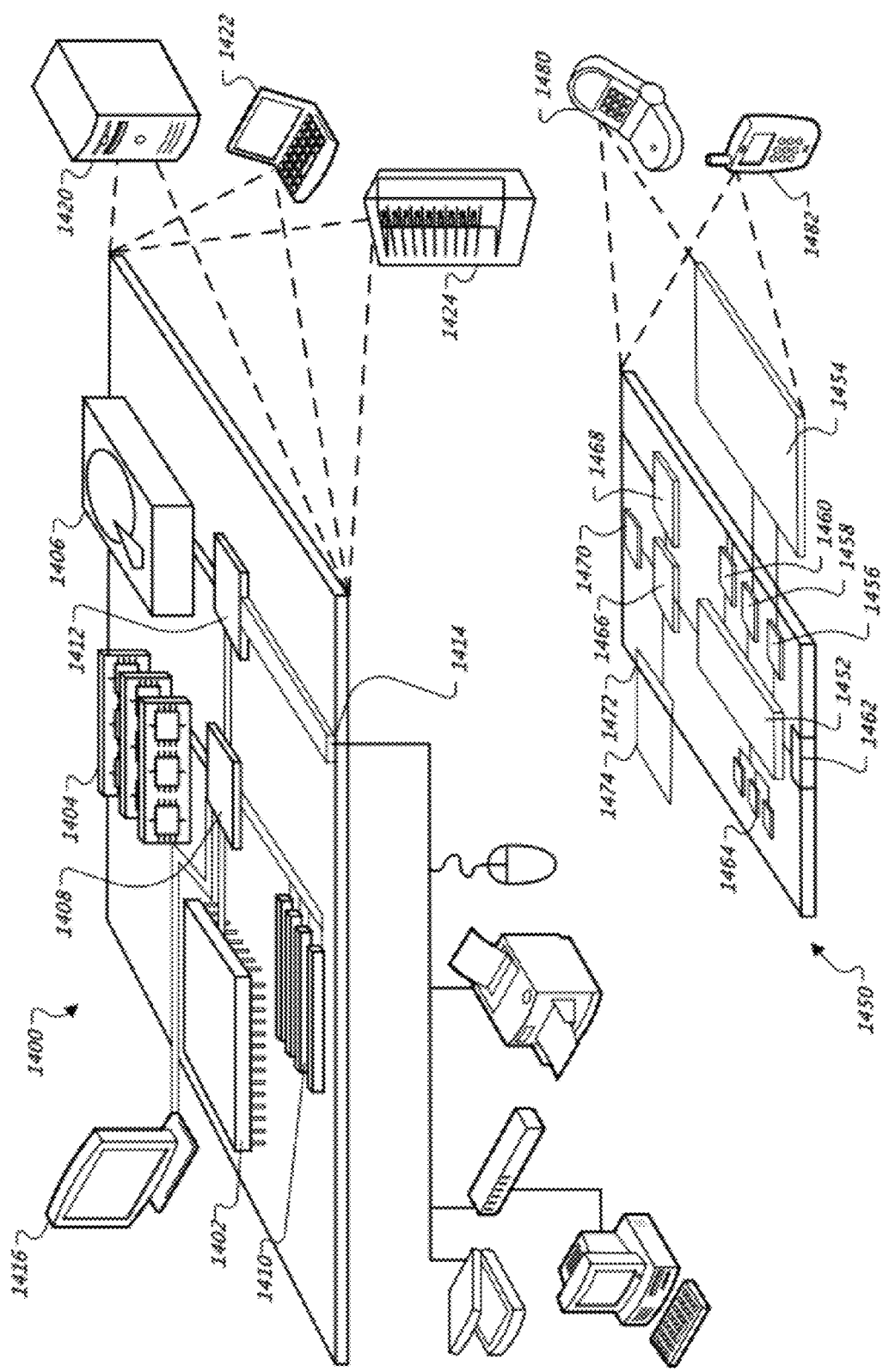
FIG. 14 is a block diagram of computing devices that may be used to implement the systems and methods described in this document, as either a client or as a server or plurality of servers.

FIG. 14 is a block diagram of computing devices 1400, 1450 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. Additionally computing device 1400 or 1450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT (Thin-Film-Transistor Liquid Crystal Display) display or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452 that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Figure 15:
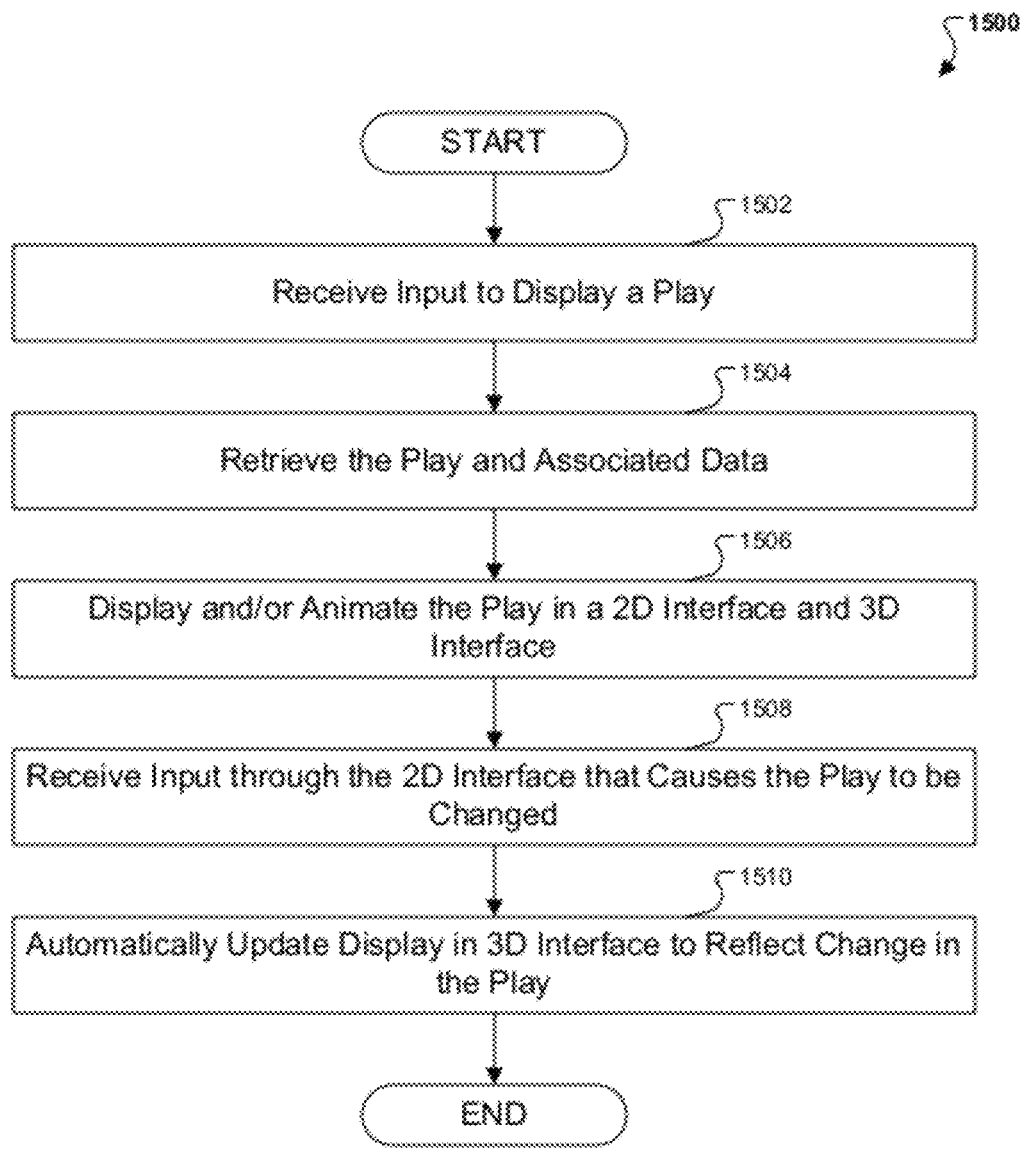
FIG. 15 is a flowchart of an example technique for changing a play through a 2D interface and synchronously displaying the changed play in a 3D interface.

FIG. 15 is a flowchart of an example technique 1500 for changing a play through a 2D interface and synchronously displaying the changed play in a 3D interface. The technique 1500 can be performed by any of a variety of computing devices, such as the computing device 1202 described above with regard to FIG. 12. The technique 1500 can be performed with and/or separately from the other described techniques.

The example technique 1500 starts at step 1502 by receiving input to display a play from a playbook. For example, input can be received in response to a user selecting a play from the list of plays provided in the pane 122, as described above with regard to FIG. 2. The play and data associated with the play (e.g., player data, route data) can be retrieved (step 1504). For example, the computing device 1202 can retrieve the play and other associated data from the data repository 1214 described above with regard to FIG. 12. The play can be displayed and/or animated in a 2D interface and a 3D interface using the retrieved data (step 1506). For example, a play is displayed and animated in the 2D interface 102 and the 3D interface 104, as described above with regard to FIGS. 1-10.

Input can be received through the 2D interface that causes at least a portion of the play to be changed (e.g., change formation, adjust routes, adjust player attributes) (step 1508). For example, FIG. 8 depicts a screenshot 800 in which a user moves the player 106 and the player's route 108 further into the backfield in the 2D interface 102. In response to receiving the input, the display in the 3D interface can be automatically updated to reflect the change to the play (step 1510). For example, the screenshot 800 in FIG. 8 depicts the 3D interface 104 being updated to reflect the change in the position of the player 110 based on the change made to the play in the 2D interface 102.

Figure 16:
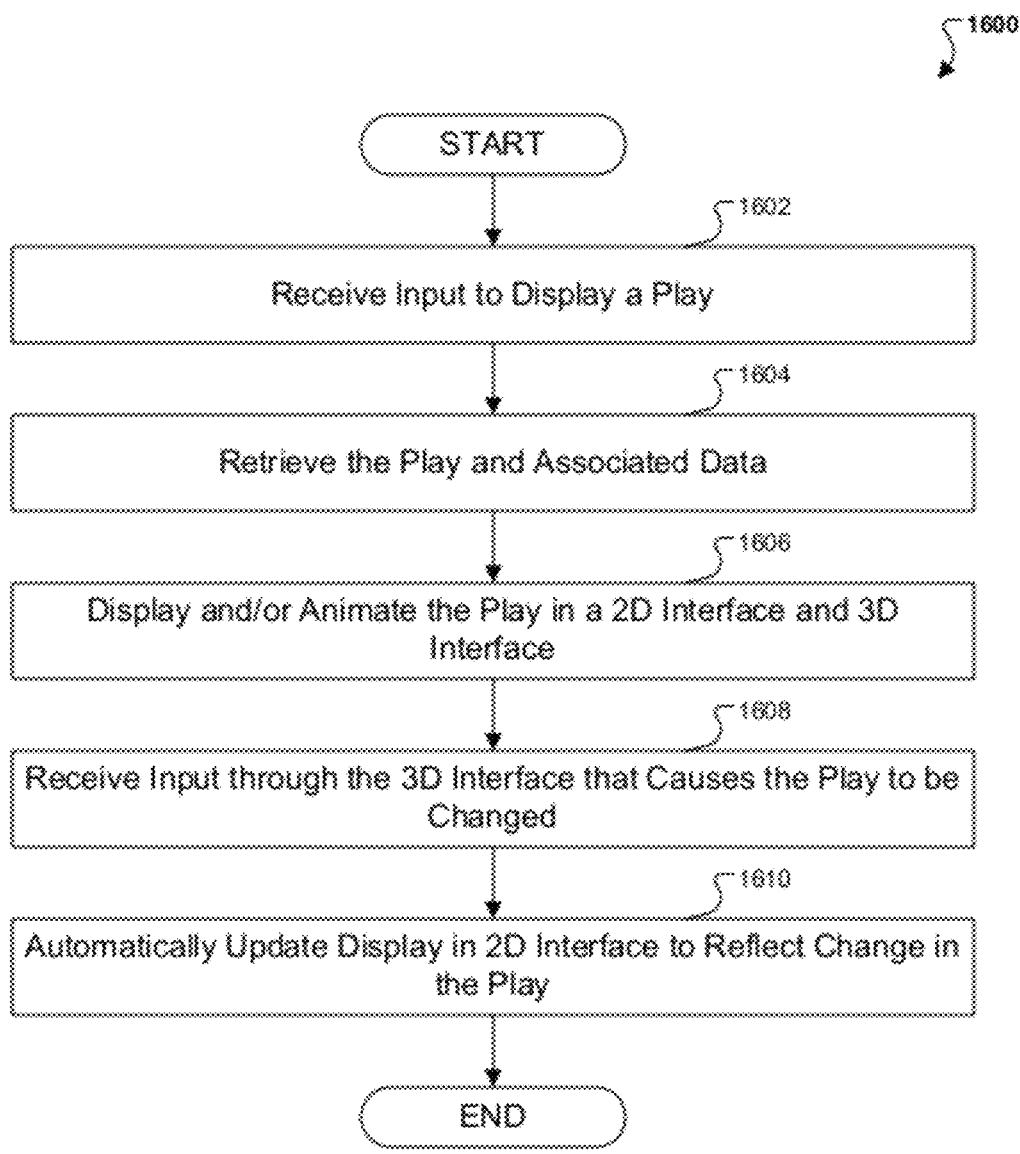
FIG. 16 is a flowchart of an example technique for changing a play through a 3D interface and synchronously displaying the changed play in a 2D interface.

FIG. 16 is a flowchart of an example technique 1600 for changing a play through a 3D interface and synchronously displaying the changed play in a 2D interface. The technique 1600 can be performed by any of a variety of computing devices, such as the computing device 1202 described above with regard to FIG. 12. The technique 1600 can be performed with and/or separately from the other described techniques.

The example technique 1600 starts at step 1602 by receiving input to display a play from a playbook. For example, input can be received in response to a user selecting a play from the list of plays provided in the pane 122, as described above with regard to FIG. 2. The play and data associated with the play (e.g., player data, route data) can be retrieved (step 1604). For example, the computing device 1202 can retrieve the play and other associated data from the data repository 1214 described above with regard to FIG. 12. The play can be displayed and/or animated in a 2D interface and a 3D interface using the retrieved data (step 1606). For example, a play is displayed and animated in the 2D interface 102 and the 3D interface 104, as described above with regard to FIGS. 1-10.

Input can be received through the 3D interface that causes at least a portion of the play to be changed (e.g., drag and drop player to different location in 3D space, adjust route and/or timing of route in 3D, change formation, adjust player attributes) (step 1608). For example, a user can adjust a route alone which the player 110 is moving in the 3D interface 104 of the screenshot 800 in FIG. 8. In response to receiving the input, the display in the 2D interface can be automatically updated to reflect the change to the play (step 1610). For example, the 2D interface 102 can be updated to depict the player 106 and the route 108 moved further into the backfield for the play based on the changes in the 3D interface 104, as depicted in the screenshot 800 in FIG. 8.

Figure 17:
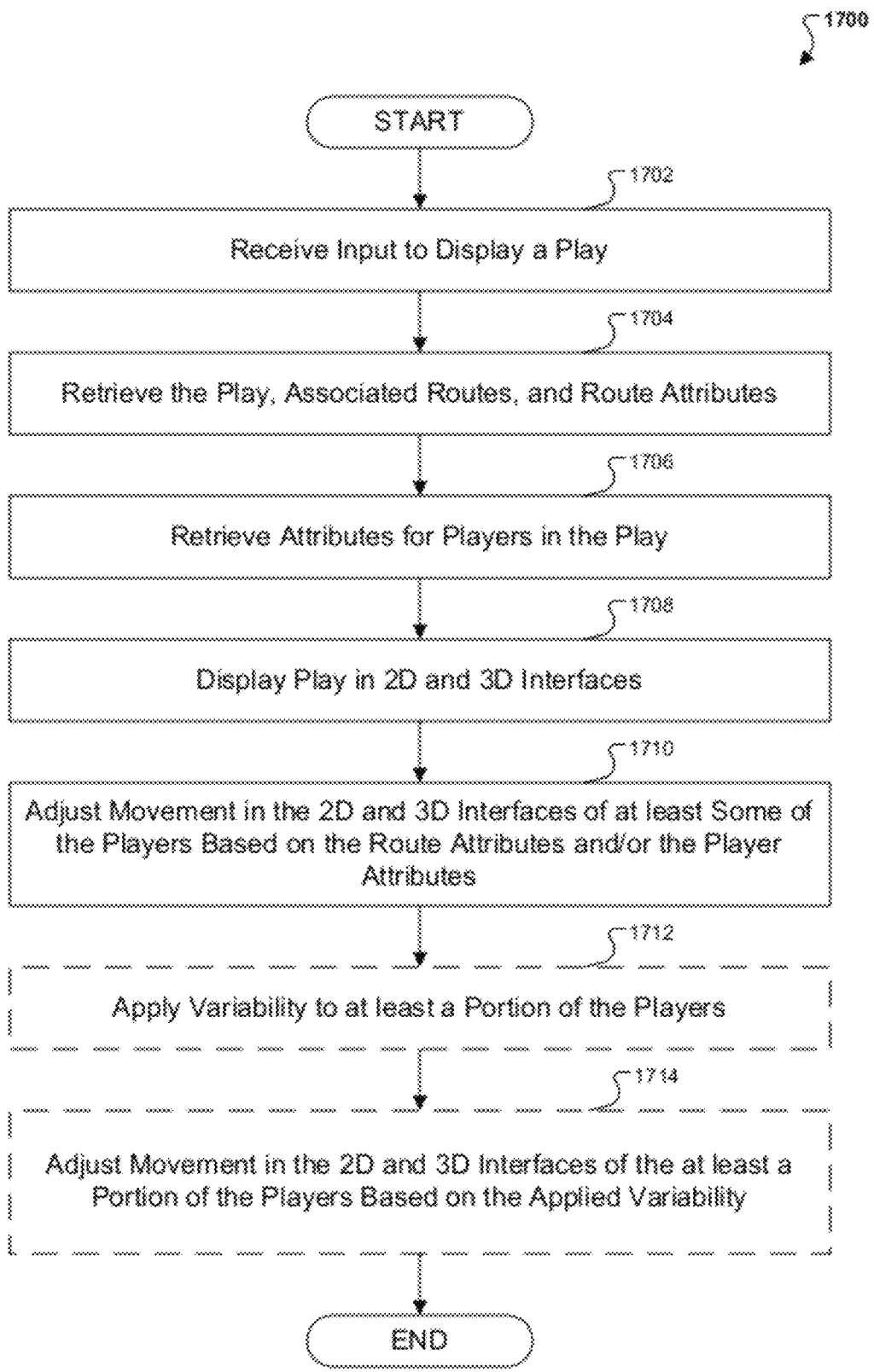
FIG. 17 is a flowchart of an example technique for adjusting the animation of plays to account for route attributes, player attributes, and/or variability.

FIG. 17 is a flowchart of an example technique 1700 for adjusting the animation of plays to account for route attributes, player attributes, and/or variability. The technique 1700 can be performed by any of a variety of computing devices, such as the computing device 1202 described above with regard to FIG. 12. The technique 1700 can be performed with and/or separately from the other described techniques.

The example technique 1700 starts at step 1702 by receiving input to display a play from a playbook. For example, input can be received in response to a user selecting a play from the list of plays provided in the pane 122, as described above with regard to FIG. 2. The play, associated routes, and route attributes can be retrieved (step 1704). For example, the computing device 1202 can retrieve the play, associated routes, and route attributes from the data repository 1214 described above with regard to FIG. 12. Attributes for the players in the play can also be retrieved (step 1706). For example, the computing device 1202 can retrieve the player attributes from the data repository 1214 described above with regard to FIG. 12. The play can be displayed and/or animated in a 2D interface and a 3D interface using the retrieved data (step 1708). For example, a play is displayed and animated in the 2D interface 102 and the 3D interface 104, as described above with regard to FIGS. 1-10.

Movement in the 2D interface and the 3D interface of at least some of the players can be adjusted based on the retrieved route attributes and/or the player attributes (step 1710). For example, player attributes can include a variety of details regarding a player and how that player may physically move, such as a player's size, speed, ability level, and/or appearance. Route attributes can include a variety of details regarding how a route is to be run, such as timing of the route and or speeds at which various portions of the route should be run. The movement of players along routes of a play can be adjusted in a 2D and a 3D interface, such as the 2D interface 102 and the 3D interface 104 described above with regard to FIGS. 1-10, based on the particular routes that are being run and the players that are running them.

In some implementations, variability can be applied to at least a portion of the players in the play (step 1712). Such variability can be used to account for variances in performance and can allow for a user to view various scenarios that may arise when a given play is run. For example, a wide receiver's route can be varied so that the receiver makes a cut earlier than expected along the route. Such a variability can be used to adjust the movement in the 2D and 3D interfaces for the at least a portion of the players in the play (step 1714). The movement of players along routes of a play can be adjusted in a 2D and a 3D interface, such as the 2D interface 102 and the 3D interface 104 described above with regard to FIGS. 1-10, based on the applied variability so as to allow users to view how possible scenarios for a play in both 2D and 3D space.

Figure 18:
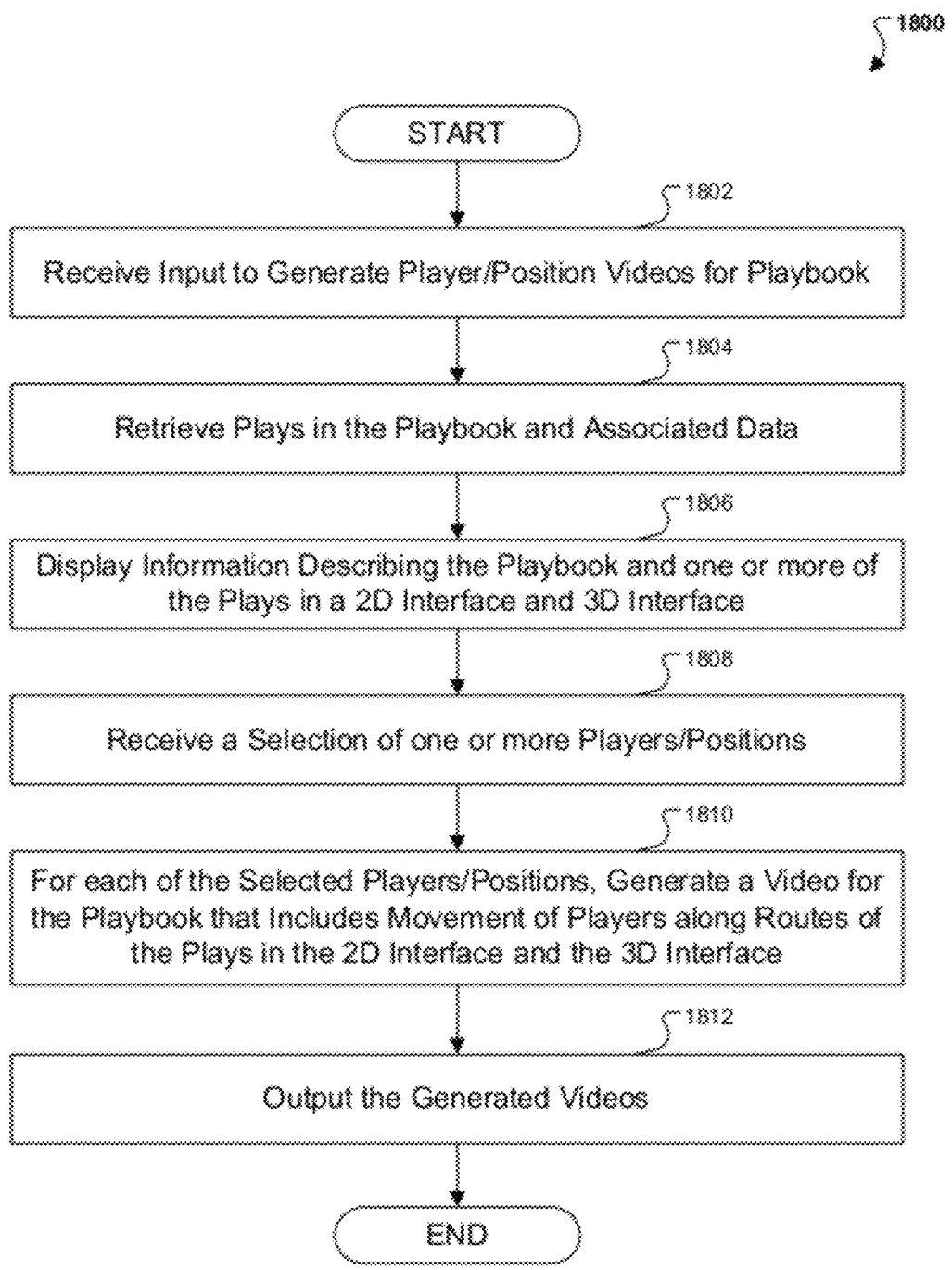
FIG. 18 is a flowchart of an example technique for generating videos from a playbook for particular players and/or positions.

FIG. 18 is a flowchart of an example technique 1800 for generating videos from a playbook for particular players and/or positions. The technique 1800 can be performed by any of a variety of computing devices, such as the computing device 1202 described above with regard to FIG. 12. The technique 1800 can be performed with and/or separately from the other described techniques.

The example technique 1800 starts at step 1802 by receiving input to generate player and/or position videos from a playbook. For example, input can be received in association with the playbook presented in the pane 122, as depicted in FIG. 2, that requests one or more position/player videos to be generated. The plays and associated data for the playbook can be retrieved (step 1804). For example, the computing device 1202 can retrieve the plays, associated routes, route attributes, and player attributes for the plays in the playbook from the data repository 1214 described above with regard to FIG. 12. Information describing the playbook and one or more of the plays can be displayed in a 2D interface and a 3D interface (step 1806). For example, a first play from the playbook can be displayed in the 2D interface 102 and the 3D interface 104, as described above with regard to FIGS. 1-10.

A user selection of one of more of the players and/or positions can be received (step 1808). For example, the user can select the player 110 from the 3D interface 104 and/or the player 106 from the 2D interface 102, as depicted above with regard to FIG. 4. For each of the selected players/positions, a video can be generated that includes movement of players along routes in the 2D interface and the 3D interface for the plays from the playbook (step 1810). For example, if the player 110 is selected, a video can be generated that includes each of the plays from a playbook (or a portion of the playbook) as run from the perspective of the player 110 in the 3D interface 104. Such a video can also include the plays animated in the 2D interface 102, as described above with regard to FIGS. 1-10. Such a video may be generated in any of a variety of appropriate video formats, such as a .mov format and/or a .mpeg2 format. Such a video may include chapters/segments that each correspond to a separate play from a playbook. Each chapter/segment can include the play run multiple times at varied speeds so that a player watching the video can have ample time to study the play. Such a video may include one or more separate video files. The generated videos can be output (step 1812). For example, the computing device 1202 can display the videos on the display 1212, provide them to the computer server system 1228 and/or 1230 over the network 1226, and/or save them locally to a storage device used by the computing device 1202.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing a 3D playbook may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, at a computing device, user input to display a sports play that involves a plurality of players moving along a plurality of routes;
   displaying, by the computing device, the play simultaneously in both a 2D interface and a 3D interface using data associated with the play and the plurality of players;
   in response to an indication for the 3D interface to use a camera view that follows a particular player from among the plurality of players, simultaneously adjusting representations of the sports play that are displayed in the 2D interface and the 3D interface to focus on the particular player, wherein the 2D interface is adjusted to highlight the particular player and the 3D interface is adjusted to use the camera view based on a location of the particular player in the play, the camera view providing a 3D representation of the play from either (i) a point of view of the particular player or (ii) a position in 3D space that focuses on the particular player, wherein the 3D representation includes graphical elements corresponding to the players, the routes, a field box that defines an area where the play occurs on a playing field, and sports equipment that is used by the players as part of the play, wherein the graphical elements are selectable and moveable in the 3D interface;
   receiving, through the 3D interface while the 3D interface (i) is focused on the particular player and (ii) depicts the play partway through being run at a point during playback that is between a start and an end of the play, user input comprising selection and movement of at least a portion of the graphical elements corresponding to one or more of: the players, the routes, the field box, and the sports equipment;
   determining, by the computing device and in response to receiving the input through the 3D interface while the 3D interface (i) is focused on the particular player and (ii) depicts the play is at the point between the start and the end of the play, a change to the play based on the movement of the selected portion of the graphical elements in the 3D interface relative to positions of an unselected portion of the players, the routes, the field box, and the sports equipment;
   automatically updating the 2D interface to depict the play based on the determined change to the play;

receiving an indication to run the play; and in response to receiving the indication to run the play, displaying the plurality of players moving synchronously in the 2D interface and in the 3D interface in a manner determined before the play is run and according to the determined change to the play, wherein the 3D interface displays the synchronous motion of the players from the camera view based on the location of the particular player and a route associated with the particular player.

2. The method of claim 1, further comprising:

receiving input through the 2D interface that causes at least a portion of the play to be changed; and automatically updating a display of the play in the 3D interface to correspond to the play as changed in the 2D interface.

3. The method of claim 1, further comprising:

retrieving one or more route attributes for the route that is associated with the particular player; and adjusting movement of the particular player in the 2D interface and the 3D interface along the route based on the one or more retrieved route attributes.

4. The method of claim 3, wherein the one or more route attributes are selected from the group consisting of: timing information for the route that indicates one or more times at which one or more segments of the route are to be run, and speed information for the route that indicates one or more speeds at which the one or more segments of the route are to be run.

5. The method of claim 1, further comprising:

retrieving one or more player attributes that are associated with the particular player; and adjusting movement or appearance of the particular player in the 2D interface and the 3D interface along the route based on the one or more retrieved player attributes.

6. The method of claim 5, wherein the one or more player attributes are selected from the group consisting of: size information that identifies one or more physical measurements for the particular player, speed information that identifies a speed at which the particular player moves, ability level information that indicates an ability or skill level of the particular player, and appearance information that identifies one or more physical characteristics of the particular player.

7. The method of claim 1, wherein the camera view comprises a point of view for the particular player that causes the 3D interface to display the play from the particular player's perspective.

8. The method of claim 1, wherein the camera view comprises a view above and behind the particular player that causes the 3D interface to display at least a portion of the particular player.

9. The computer-implemented method of claim 1, wherein the determined change to the play comprises one or more of the players and one or more of the routes being moved from one or more first positions to one or more second positions in at a point in time of the play.

10. The computer-implemented method of claim 1, wherein the determined change to the play comprises the field box being moved from a first area of the playing field to a second area of the playing field; and the method further comprising:

updating the play based, at least in part, on the second area of the playing field to which the field box has been moved.

11. The computer-implemented method of claim 1, wherein positions for the selected portion of the graphical elements are visually updated relative to the unselected portion of the players, the routes, the field box, and the sports equipment in the 3D representation of the play while the selected portion of the graphical elements are being moved so as to provide 3D positional feedback to a user regarding the change to the play.

12. The computer-implemented method of claim 1, further comprising:

determining variability with regard to how one or more of the players execute their portion of the play, the variability increasing or decreasing one or more of speed and size of the one or more players; and wherein the players are synchronously moved in the 2D interface and the 3D interface according to determined change to the play and the determined variability for the execution of the play by the one or more of the players.

13. A non-transitory computer readable medium having embodied thereon a computer program product including instructions that, when executed, cause a computing device with a processor to perform operations comprising:

receiving, at a computing device, user input to display a sports play that involves a plurality of players moving along a plurality of routes;

displaying, by the computing device, the play in both a 2D interface and a 3D interface using data associated with the play and the plurality of players;

in response to an indication for the 3D interface to use a camera view that follows a particular player from among the plurality of players, simultaneously adjusting representations of the sports play that are displayed in the 2D interface and the 3D interface to focus on the particular player, wherein the 2D interface is adjusted to highlight the particular player and the 3D interface is adjusted to use the camera view of the 3D interface based on a location of the particular player in the play, the camera view providing a 3D representation of the play from either (i) a point of view of the particular player or (ii) a position in 3D space that focuses on the particular player, wherein the 3D representation includes graphical elements corresponding to the players, the routes, a field box that defines an area where the play occurs on a playing field, and sports equipment that is used by the players as part of the play, wherein the graphical elements are selectable and moveable in the 3D interface;

receiving, through the 3D interface while the 3D interface (i) is focused on the particular player and (ii) depicts the play partway through being run at a point during playback that is between a start and an end of the play, user input comprising selection and movement of at least a portion of the graphical elements corresponding to one or more of: the players, the routes, the field box, and the sports equipment;

determining, by the computing device and in response to receiving the input through the 3D interface while the 3D interface (i) is focused on the particular player and (ii) depicts the play is at the point between the start and the end of the play, a change to the play based on the movement of the selected portion of the graphical elements in the 3D interface relative to positions of an unselected portion of the players, the routes, the field box, and the sports equipment;

automatically updating the 2D interface to depict the play based on the determined change to the play;

receiving an indication to run the play; and in response to receiving the indication to run the play, displaying the plurality of players moving synchronously in the 2D interface and in the 3D interface in a manner determined before the play is run and according to the determined change to the play, wherein the 3D interface displays the synchronous motion of the players from the camera view based on the location of the particular player and a route associated with the particular player.

14. The non-transitory computer readable medium of claim 13, wherein the operations further comprise:
    receiving input through the 2D interface that causes at least a portion of the play to be changed; and
    automatically updating a display of the play in the 3D interface to correspond to the play as changed in the 2D interface.

15. The non-transitory computer readable medium of claim 13, wherein the operations further comprise
    retrieving one or more route attributes for the route that is associated with the particular player; and
    adjusting movement of the particular player in the 2D interface and the 3D interface along the route based on the one or more retrieved route attributes.

16. The non-transitory computer readable medium of claim 13, wherein the operations further comprise
    retrieving one or more player attributes that are associated with the particular player; and
    adjusting movement or appearance of the particular player in the 2D interface and the 3D interface along the route based on the one or more retrieved player attributes.

17. The non-transitory computer readable medium of claim 13, wherein the camera view comprises a point of view for the particular player that causes the 3D interface to display the play from the particular player's perspective.

18. The non-transitory computer readable medium of claim 13, wherein the camera view comprises a view above and behind the particular player that causes the 3D interface to display at least a portion of the particular player.

19. A computer system comprising:
    a computing device that includes at least one processor;
    an input device of the computing device to receive user input to display a sports play that involves a plurality of players moving along a plurality of routes;
    a display of the computing device to display the play simultaneously in both a 2D interface and a 3D interface using data associated with the play and the plurality of players; and
    a 3D playbook application of the computing device that is programmed to:
    i) simultaneously adjust representations of the sports play that are displayed in the 2D interface and the 3D interface to focus on a particular player from among the plurality of players, wherein the 2D interface is adjusted to highlight the particular player and the 3D interface is adjusted to use the camera view based on a location of the particular player in the play, the camera view providing a 3D representation of the play from either (i) a point of view of the particular player or (ii) a position in 3D space that focuses on the particular player, wherein the 3D representation includes graphical elements corresponding to the players, the routes, a field box that defines an area where the play occurs on a playing field, and sports equipment that is used by the players as part of the play, wherein the graphical elements are selectable and moveable in the 3D interface,
    ii) receive, through the 3D interface while the 3D interface (i) is focused on the particular player and (ii) depicts the play partway through being run at a point during playback that is between a start and an end of the play, user input comprising selection and movement of at least a portion of the graphical elements corresponding to one or more of: the players, the routes, the field box, and the sports equipment;
    iii) determine, and in response to receiving the input through the 3D interface while the 3D interface (i) is focused on the particular player and (ii) depicts the play is at the point between the start and the end of the play, a change to the play based on the movement of the selected portion of the graphical elements in the 3D interface relative to positions of an unselected portion of the players, the routes, the field box, and the sports equipment;
    iv) automatically update the 2D interface to depict the play based on the determined change to the play;
    v) cause the display to present the plurality of players moving synchronously in the 2D interface and in the 3D interface in a manner determined before the play is run and according to the determined change to the play, wherein the 3D interface displays the synchronous motion of the players from the camera view based on the location of the particular player and a route associated with the particular player.

20. The computer system of claim 19, further comprising a data repository to store one or more player attributes that are associated with the particular player;
    wherein the 3D playbook application is further configured to adjusting movement or appearance of the particular player in the 2D interface and the 3D interface along the route based on the one or more player attributes.

* * * * *